US006606355B1

(12) United States Patent
Wei

(10) Patent No.: US 6,606,355 B1
(45) Date of Patent: Aug. 12, 2003

(54) CHANNEL CODING IN THE PRESENCE OF BIT ROBBING

(75) Inventor: Lee-Fang Wei, Lincroft, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/425,361

(22) Filed: Oct. 22, 1999

Related U.S. Application Data

(63) Continuation-in-part of application No. 08/855,829, filed on May 12, 1997, now Pat. No. 6,157,678.

(51) Int. Cl.[7] ............................................. H04L 27/36
(52) U.S. Cl. ..................... 375/242; 375/298; 370/523
(58) Field of Search ................................ 375/261, 265, 375/298, 242; 370/523

(56) References Cited

U.S. PATENT DOCUMENTS

| | | | |
|---|---|---|---|
| 4,807,253 A | 2/1989 | Hagenauer et al. | ........... 375/57 |
| 5,105,443 A | 4/1992 | Betts et al. | .................... 375/39 |
| 5,862,184 A | 1/1999 | Goldstein et al. | ........... 375/295 |
| 5,926,505 A | 7/1999 | Long | .......................... 375/222 |

OTHER PUBLICATIONS

J. Hagenauer et al. "The Performance of Rate–Compatible Punctured Convolutional Codes for Digital Mobile Radio," *IEEE Transactions on Communications*, vol. 38, No. 7, pp. 966–980, Jul. 1990.

G. D. Forney, Jr. et al., "Multidimensional Constellations—Part I: Introduction, Figures of Merit, and Generalized Cross Constellations," *IEEE J. Select. Areas Commun.*, vol. SAC–7, pp. 877–892, Aug. 1989.

*Primary Examiner*—Amanda T. Le
(74) *Attorney, Agent, or Firm*—Jeffrey M. Weinick

(57) ABSTRACT

Signal points from a PCM-derived constellation are selected for transmission via a modulation technique which employs different levels of redundancy coding—including the possibility of no redundancy coding—for respective different sub-constellations of the overall PCM-derived constellation. The coding that is employed for at least one of the sub-constellations is carried out independently from any coding that is employed for any of the other sub-constellations. The PCM-derived constellation and the overall modulation technique are designed so as to accommodate the possibility that the telecommunications system in which the modulation technique is implemented may include so-called bit robbing and so-called digital attenuation. The bit-robbing, in particular, is accommodated by using the output of a single redundancy encoder, such as a trellis encoder, to identify signaling constellation subsets for both the bit-robbed and non-bit-robbed intervals, the number of signal points in the subsets being less for the bit-robbed intervals than for the non-bit-robbed intervals.

29 Claims, 7 Drawing Sheets

FIG. 8

| | 1st 8-BIT PCM WORD | 2nd 8-BIT PCM WORD | 3rd 8-BIT PCM WORD | 4th 8-BIT PCM WORD | 5th 8-BIT PCM WORD | 6th 8-BIT PCM WORD |
|---|---|---|---|---|---|---|
| BIT STREAM FROM TRANSMITTING MODEM 20 | $b_7 b_6 b_5 b_4 b_3 b_2 b_1 b_0$ | $b_7 b_6 b_5 b_4 b_3 b_2 b_1 b_0$ | $b_7 b_6 b_5 b_4 b_3 b_2 b_1 b_0$ | $b_7 b_6 b_5 b_4 b_3 b_2 b_1 b_0$ THIS BIT IS PROBED BY TELEPHONE NETWORK 40 AND REPLACED WITH $C_0$ | $b_7 b_6 b_5 b_4 b_3 b_2 b_1 b_0$ | $b_7 b_6 b_5 b_4 b_3 b_2 b_1 b_0$ |
| BIT STREAM RECEIVED BY FAR-END CENTRAL OFFICE 50 | $b_7 b_6 b_5 b_4 b_3 b_2 b_1 b_0$ | $b_7 b_6 b_5 b_4 b_3 b_2 b_1 b_0$ | $b_7 b_6 b_5 b_4 b_3 b_2 b_1 b_0$ | $b_7 b_6 b_5 b_4 b_3 b_2 b_1 C_0$ | $b_7 b_6 b_5 b_4 b_3 b_2 b_1 b_0$ | $b_7 b_6 b_5 b_4 b_3 b_2 b_1 b_0$ |
| CONSTELLATION USED BY TRANSMITTING MODEM 20 AND RECEIVING MODEM 60 | APPENDIX II | APPENDIX II | APPENDIX II | APPENDIX II | APPENDIX II | APPENDIX II |

CHANNEL CODING IN THE PRESENCE OF BIT ROBBING

CROSS-REFERENCE TO RELATED APPLICATION

This is a continuation-in-part of application Ser. No. 08/855,829, U.S. Pat. No. 6,157, 678 filed on May 12, 1997, which is incorporated herein by reference.

BACKGROUND OF THE INVENTION

The present invention relates to the transmission of data over telecommunications networks.

Recent advances have made possible the design of voiceband modems capable of achieving data rates as high as 56 kilobits per second (kbps). At the heart of this technology is the realization that one can completely eliminate the quantization noise introduced by PCM vocoders within the telephone network—which acts as a source of impairment in the overall channel—by encoding the data bits to be transmitted using the codes which represent the vocoders' quantization levels and delivering those codes to the network in their digital form. By thus matching the amplitudes of the transmitted signal—actually represented by an 8-bit word—to the predefined quantization levels of the vocoder, the receiving vocoder's analog output amplitude is made to be an exact, rather than an approximated, representation of the input amplitude. In essence, this approach implements a modulated signaling scheme based on a constellation of signal points derived from the quantization levels of the vocoder. Such a constellation is herein referred to as a "PCM-derived constellation." See, for example, my co-pending U.S. Pat. application Ser. No. 08/53,351 U.S. Pat. No. 5,953,376, filed Nov. 25, 1996, hereby incorporated by reference, and the parent application hereof, which describe arrangements using trellis-coded modulation with a PCM-derived constellation in a way which achieves significant coding gain.

A potential problem in the practical implementation of this technology results from the fact that some PCM links, at least in North America, utilize so-called bit robbing in order to provide an in-band signaling channel for signaling and maintenance purposes. In particular, for one out of every six of the 8-bit words representing the various PCM quantization levels, the least significant bit of that word is preempted by the telephone network to implement that in-band channel. In practical effect, this means that there is a 50% chance that a different word than the one that was transmitted will be received at the far-end central office. The mapping between the 8-bit patterns and the various PCM quantization levels is such that when this occurs, the quantization level that is identified by the modified 8-bit word is adjacent to the original quantization level. From the standpoint of voice communications, this substitution of one quantization level for the adjacent one is not noticeable to the listener. However, it has potentially much greater impact for data communication because unless some mechanism is in place to compensate for this effect, there will be a very large, perhaps catastrophic, impact on the bit error rate. Indeed, it is possible that within different PCM links involved in a particular connection, the bit robbing may be applied to different ones of the 8-bit words, thereby making this problem all the worse. In addition, when the modulation scheme implemented in such modems includes, for example, trellis encoding, the problem may become even more severe because unless something is done, error propagation effects may cause erroneous data recovery vis-a-vis not only the data transmitted during bit-robbed intervals but also the data transmitted in non-bit-robbed intervals.

SUMMARY OF THE INVENTION

In accordance with the present invention, the bit-robbing phenomenon is accommodated by using the output of a single redundancy encoder (e.g., trellis encoder) to identify signaling constellation subsets for both the bit-robbed and non-bit-robbed intervals, the number of signal points in the subsets being less for the bit-robbed intervals than for the non-bit robbed intervals. The reduced data rate supportable by the smaller subsets used for the non-bit-robbed intervals is consonant with the fact that a bit is robbed and, all other things being equal, the channel can only support a lower data rate during such intervals.

An alternative approach that one might think to employ is to use two separate trellis encoders, one for the bit-robbed signaling intervals and one for the non-bit-robbed signaling intervals. Such an approach, however, will engender significantly decoding delay in the receiver because a particular number of signal points transmitted during the bit-robbed signaling intervals—equal to the so-called decoding depth—would have to be received before a decoding decision can be made, thus increasing the decoding delay by six-fold, for example, in the case where bit robbing occurs once every six signaling intervals. The fact that the present invention uses a single coder across both bit-robbed and non-bit-robbed intervals, however, advantageously avoids any such decoding delay problem.

Bit robbing is but one example of a phenomenon wherein channel conditions may change in a known, or deterministic way, and the invention is thus potentially more generally applicable to any coded modulation environment in which the channel conditions may so change.

BRIEF DESCRIPTION OF THE DRAWING

FIG. 8 illustrates the phenomenon of bit robbing within the telecommunications system of FIG. 1.

DETAILED DESCRIPTION

Figure 1:
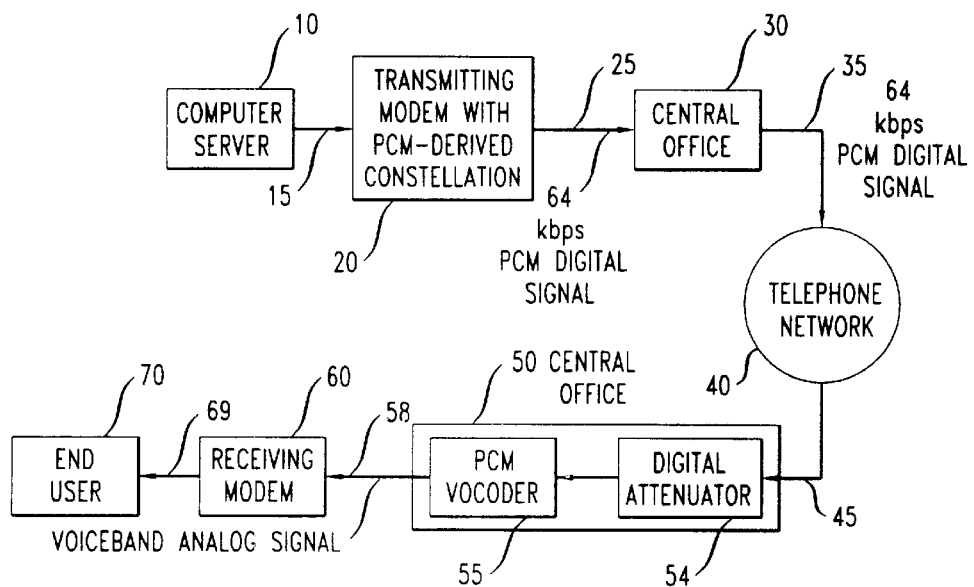
FIG. 1 is a block diagram of a telecommunications system embodying the principles of the present invention.

In the telecommunications system of FIG. 1, a stream of data bits provided on line 15 by a computer server 10 are transmitted at, illustratively, a rate of 56 kilobits per second (kbps), to an end user terminal 70. Illustratively, data bits are communicated in the other direction—from end-user terminal 70 to server 10—at a significantly lower data rate, consistent with such applications as World Wide Web access wherein server-to-user communications need to be at a relatively high rate in order to transmit graphical information whereas user-to-server communications—typically representing individual alphabetic characters, "mouse clicks" and the like—can be at a much lower rate. For clarity of presentation, the latter, "upstream," communications are not represented in FIG. 1. A discussion of upstream communications appears in my above-cited '351 patent application.

Figure 2:
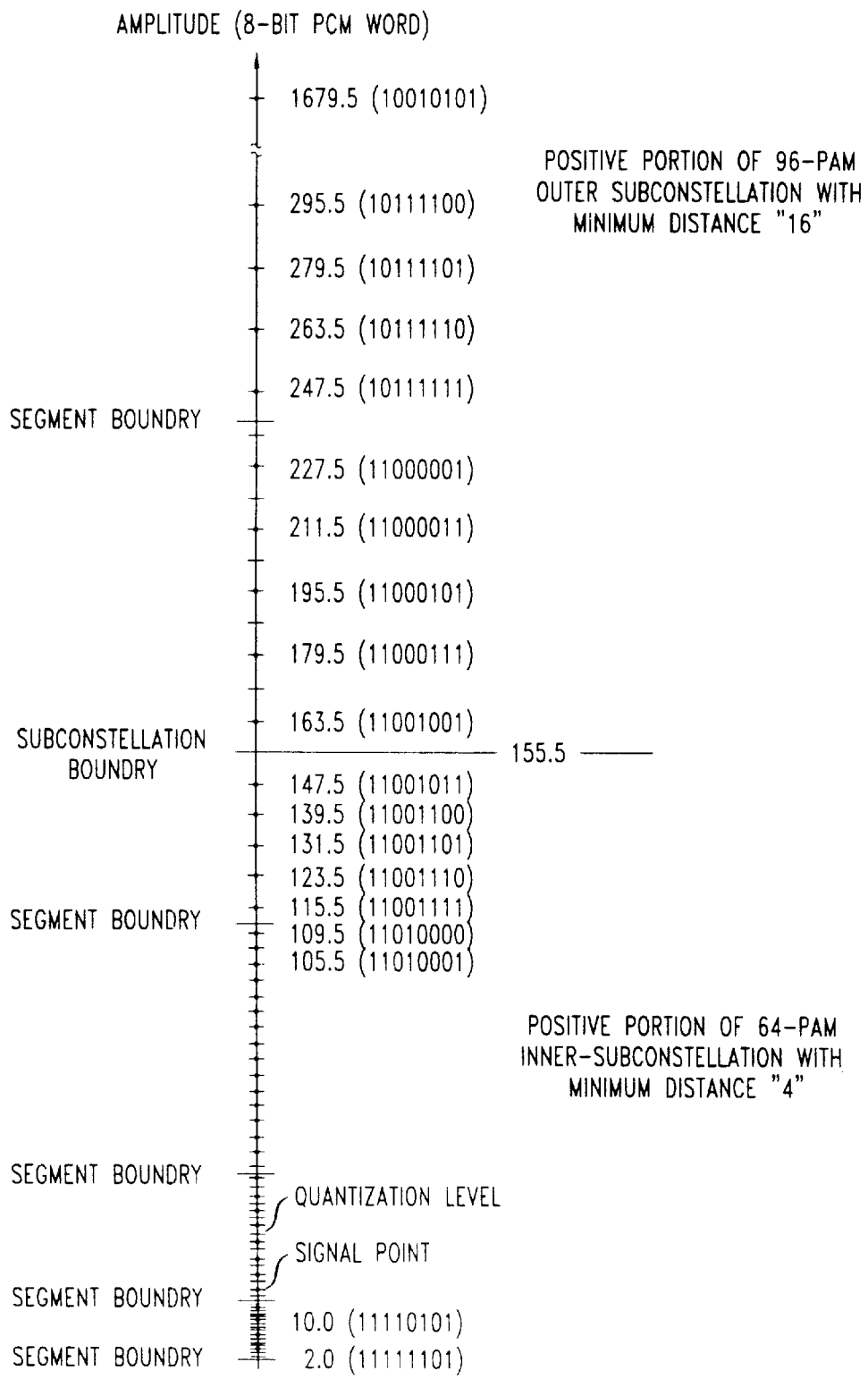
FIG. 2 shows a portion of an illustrative PCM-derived signal constellation.

The 56 kbps output of server 10 is applied to a transmitting modem 20 which is typically co-located with the server. In turn, the output of modem 20 is applied to near-end central office 30. Unlike conventional voiceband modems, the output of modem 20 is not a modulated carrier signal but, rather, a digital signal which is communicated to central office 30 over a digital line 25. The digital signal on line 25 comprises a sequence of 8-bit words, with each different combination of 8-bit word values representing a respective signal point of a predefined signal constellation. The points of that constellation comprise a selected subset of the quantization levels of a conventional $\mu$-law or A-law vocoder. Such a constellation, herein referred to as a "PCM-derived constellation," is shown in FIG. 2 and is discussed in detail below. Although the output data rate of computer server 10 is 56 kilobits per second (kbps), the output data rate of modem 20 is 64 kbps, consistent with the conventional PCM digital signal format. The manner in which the 56 kbps signal becomes a 64 kbps signal will become clear as this description continues.

Significantly, since the 64 kbps signal received by central office 30 is already in PCM format, it is not subjected to any quantization or other processing that is applied, for example, to analog voice signals that may also be received by central office 30. Rather, the PCM-formatted signal received from line 25, extended over trunk 35, telephone network 40, and trunk 45 to far end central office 50, is transmitted in PCM form.

Although the signal generated by modem 20 is a digital signal, the overall connection between server 10 and end user terminal 70 is not fully digital. Rather, the signal as applied to far-end central office 50 is indistinguishable—from the perspective of central office 50—from any other 64 kbps PCM-encoded signal that may be communicated to it, such as an encoded voice signal or conventional voiceband modem signal. That is, central office 30 applies the signal that originated from modem 20 to a conventional PCM channel. Thus when that signal arrives at far-end central office 50, it is applied to a PCM vocoder 55 just like all the other PCM-encoded signals that arrive at central office 50. (For the moment it will be assumed that digital attenuator 54 shown in FIG. 1 is not present, being discussed at a more appropriate point hereinbelow.) The output of PCM vocoder 55 is thus a voiceband analog signal occupying a bandwidth of (typically) 3.5 kHz. That signal is transmitted to the user premises over analog local loop 58.

At the user premises, a receiving modem 60 demodulates and decodes the received voiceband analog signal—representing transmitted signal points of the PCM-derived constellation—consistent with the manner in which those signal points were generated in modem 20. The resulting 56 kbps output bit stream on lead 69 is then presented to end user terminal 70, which is illustratively a subscriber's personal computer.

The nature of the PCM-derived signal constellation can be understood from a consideration of FIG. 2, which shows a PCM-derived constellation designed pursuant to the principles of my above-cited '351 patent application. Indeed, the constellation in FIG. 2 hereof is the same as that in FIG. 2 of that application.

The $\mu$- or A-law quantization used in conventional PCM encoding employs 255 or 256 quantization levels, and what is represented in FIG. 2 are 128 non-negative quantization levels of a $\mu$-law encoder, represented by the short cross bars. These quantization levels are divided into eight segments each having 16 equally spaced quantization levels as demarcated by the longer cross bars marked "segment boundary". The amplitude range of each of the eight segments is approximately double that of the next-lower-in-amplitude segment. Thus the distance between quantization levels within a segment doubles for each successive segment. This scheme thus provides logarithmic compression of the analog signals to be quantized. As a consequence of the aforementioned doubling, and the consequent wide spacing between the quantization levels of the higher-amplitude segments, it is inconvenient to explicitly show to scale in the drawing all 128 quantization levels. Rather, FIG. 2 shows explicitly all of the quantization levels of only the first four segments and a few of the other quantization levels. The $\mu$-law encoder also includes 127 negative quantization levels, which are arranged in mirror image to that of the positive quantization levels.

The signal points of the PCM-derived signal constellation comprise selected ones of the PCM quantization levels, thereby advantageously eliminating PCM quantization noise as a source of noise in the overall system, as described above. The particular signal points comprising the PCM-derived signal constellation used by modems 20 and 60 are represented as dots in FIG. 2. There are 80 positive-valued signal points but, again, because of the aforementioned wide spacing, it is not practical to show in FIG. 2 all of the 80 signal points explicitly. The PCM-derived constellation also contains 80 negatively-valued signal points in the mirror image. The exact amplitude levels of all 160 signal points of this illustrative PCM-derived constellation (along with the scheme by which the data to be coded is represented by those signal points, as explained below) are shown in Appendix I of my above-cited '351 patent application. Also shown in FIG. 2 are the values of the aforementioned 8-bit words which standard $\mu$-law encoding assigns to each different quantization level.

Applying conventional design principles to the selection of the signal points of a PCM-derived constellation—assuming a given number of points in the signal constellation in order to achieve a desired overall data bit rate—would lead to choosing ones of the quantization levels a) that are as equally spaced as possible and, b) for which the minimum distance between the levels is as large as possible consistent with the telephone network's peak and average power constraints. The minimum distance criterion, in particular, is a critical design parameter because the transmitted signal points, when they traverse local loop 58, are inevitably displaced in signal space by channel noise and other channel impairments. Thus the extent to which a transmitted signal point may be erroneously detected at receiving modem 60 depends on how "far away" the transmitted signal point is from its nearest neighbors in the PCM-derived constellation. Such a scheme will achieve a certain expected level of error rate performance—i.e., an average of X bits errors in the receiver for every Y bits transmitted, which may be adequate for particular applications. If a higher level of error rate performance is required, it is known to apply channel coding techniques such as trellis-coded modulation (TCM) to an existing signaling scheme in order to achieve an effective minimum distance between the constellation signal points which is greater than the actual minimum Euclidian distance between the signal points. Indeed, my above-cited '351 patent application explains how to use trellis-coded modulation with a PCM-derived constellation in a way which achieves significantly increased effective minimum distance for the constellation. In particular, this is achieved, as shown in FIG. 2, by dividing the PCM-derived constellation into sub-constellations—in this example, two sub-constellations called the inner and outer sub-constellations. The inner sub-constellation illustratively comprises 64 signal points with an actual minimum distance of "4," that minimum distance being, for example, the distance between the signal points whose amplitudes are "−2" and "+2". (It is assumed herein that the minimum distance between the PCM vocoder quantization levels has a normalized value of "1".) The outer sub-constellation comprises 96 points and the actual minimum distance of that constellation is "16," such as the distance between the points whose amplitudes are "163.5" and "179.5". The actual minimum distance of the inner sub-constellation is smaller than that of the outer sub-constellation so that if nothing else were to be done, the minimum distance of the overall constellation would be "4," which would determine the overall performance of the constellation (because it is such signal points that are most likely to be mistaken for one another when channel noise and other impairments causes a signal point to be displaced from its original amplitude). However, a selected trellis code is used in conjunction with the inner sub-constellation, while a lesser level of trellis coding—in this example, in fact, no trellis coding whatsoever—is used for the outer sub-constellation. Thus while the minimum distance of the outer sub-constellation remains at "16," the trellis coding causes the effective minimum distance of the inner sub-constellation—and thus the effective minimum distance of the constellation as a whole—to be significantly increased from "4."

More specifically, the "effective minimum distance" of a constellation (or, in this case, sub-constellation) is given by the square root of the minimum sum of the squared Euclidian distance between each pair of signal points in any two valid signal point sequences. Not every sequence of signal points is valid in a trellis-coded system, which is what gives rise to its enhanced immunity to noise and other channel impairments. In the typical uncoded system, by contrast, every sequence of signal points is valid, in which case the effective minimum distance of the constellation is the same as its actual minimum distance, i.e., the minimum Euclidian distance between any two signal points of the constellation. See, for example, "Trellis-Coded Modulation with Multidimensional Constellations," *IEEE Trans. on Information Theory*, pp. 483–501, July 1987, wherein the parameter referred to herein as the "effective minimum distance" is the same as the square root of what is referred to in that article as the "minimum squared Euclidian distance between any two valid sequences of signal points".

The increase in the minimum distance of a sub-constellation from its actual to its effective minimum distance can be expressed as a nominal decibel gain, given by $20 \log_{10}$ (effective minimum distance/actual minimum distance), that parameter thus being a measure of the improvement in error immunity that results from use of the trellis code. (The true decibel gain is less than the nominal decibel gain due to the effect of a larger so-called error coefficient that usually associated with the code. In the present embodiment, for example, there is a 0.5 dB difference between the nominal and true decibel gains. For purposes of this invention, the term "decibel gain" can be understood to refer to either the true or nominal decibel gain.)

For the constellation of FIG. 2, the effective minimum distance of the inner sub-constellation is "15", as compared to an actual minimum distance of "4", yielding a nominal decibel gain of 11.5 dB.

The effective minimum distance of the inner sub-constellation is preferably made equal, or as nearly equal as practical, to the effective minimum distance of the outer sub-constellation. Using the particular trellis code employed in the present illustrative embodiment, as described in detail hereinbelow, the effective minimum distance of the inner sub-constellation—"15"—is to be compared to the effective minimum distance (=actual minimum distance) of "16" for the outer sub-constellation. This is a better result than is achieved by prior arrangements, either without using any trellis-coded modulation, or using trellis-coded modulation across the entire PCM-derived constellation, as would be prescribed by prior art practice.

(It should be noted as a further implementational detail that the minimum distance between the sub-constellations should ideally be no less than the smallest of the effective minimum distances of the various sub-constellations. This is because what ultimately determines performance here is the effective minimum distance of the overall PCM-derived constellation, which is the minimum of i) the effective minimum distances between of the signal points of the various sub-constellations and ii) the minimum distances between the various sub-constellations themselves. This criterion is met in the present illustrative embodiment, in that the minimum distance between the inner and outer sub-constellations is the distance between the points whose amplitudes are "147.5" and "163.5," namely "16"(>"15").)

More generally in accordance with the invention set forth in my above-cited '351 patent application, there may be any desired number of sub-constellations, which are preferably non-overlapping. That is, none of the sub-constellations has a signal point whose amplitude falls between the amplitudes of a pair of signal points of any other sub-constellation. Alternatively stated for the case of two sub-constellations, the signal points of the first sub-constellation are all of lower amplitude than any of the signal points of the second sub-constellation. Different levels of redundancy coding—including the possibility of no redundancy coding—are employed for respective different sub-constellations of the overall PCM-derived constellation. The redundancy coding is illustratively trellis coding. The trellis codes employed in conjunction with sub-constellations having increasingly smaller minimum distance between signal points provide respectively increasing amounts of decibel gain in order to compensate for that increasingly smaller minimum distance thereby increasing the effective minimum distance to an appropriate degree for each sub-constellation. Thus in the embodiment of FIG. 2, for example, the inner sub-constellation, since it has the smaller actual minimum distance of "4," is provided with greater decibel gain than the outer sub-constellation (which, again, is illustratively provided with none).

The approach just described, overall, increases the effective minimum distance between the signal points of the PCM-derived constellation as a whole for a given data rate and a given average power constraint and thus allows for an increase in the data rate over that previously achievable with an equivalent level of performance.

Applying the thinking of the prior art to, for example, the constellation of FIG. 2 would lead one to try to include within the inner constellation only signal points which are separated from one another by the overall minimum distance, "4," of the inner sub-constellation. One would not be motivated, based on this criterion, to include signal points whose distance is "8"—the next largest standard PCM vocoder spacing—because the performance of the inner sub-constellation would be dominated by the minimum distance "4" and thus including points with a distance "8" would be thought to do nothing more than increase (albeit perhaps to a small degree) implementational complexity while not improving performance. In FIG. 2 the inner sub-constellation does include a number of such higher-distance points between "115.5" and "147.5" inclusive. This provides a total of 64 inner constellation signal points, allowing for a simple implementation of the "steering bit" mechanism described in my above-cited '351 patent application since 64 is an integer power of 2 (i.e., $2^6$). However, the number of such higher-distance points included in the inner sub-constellation was kept to a minimum consistent with that implementational goal.

Figure 3:
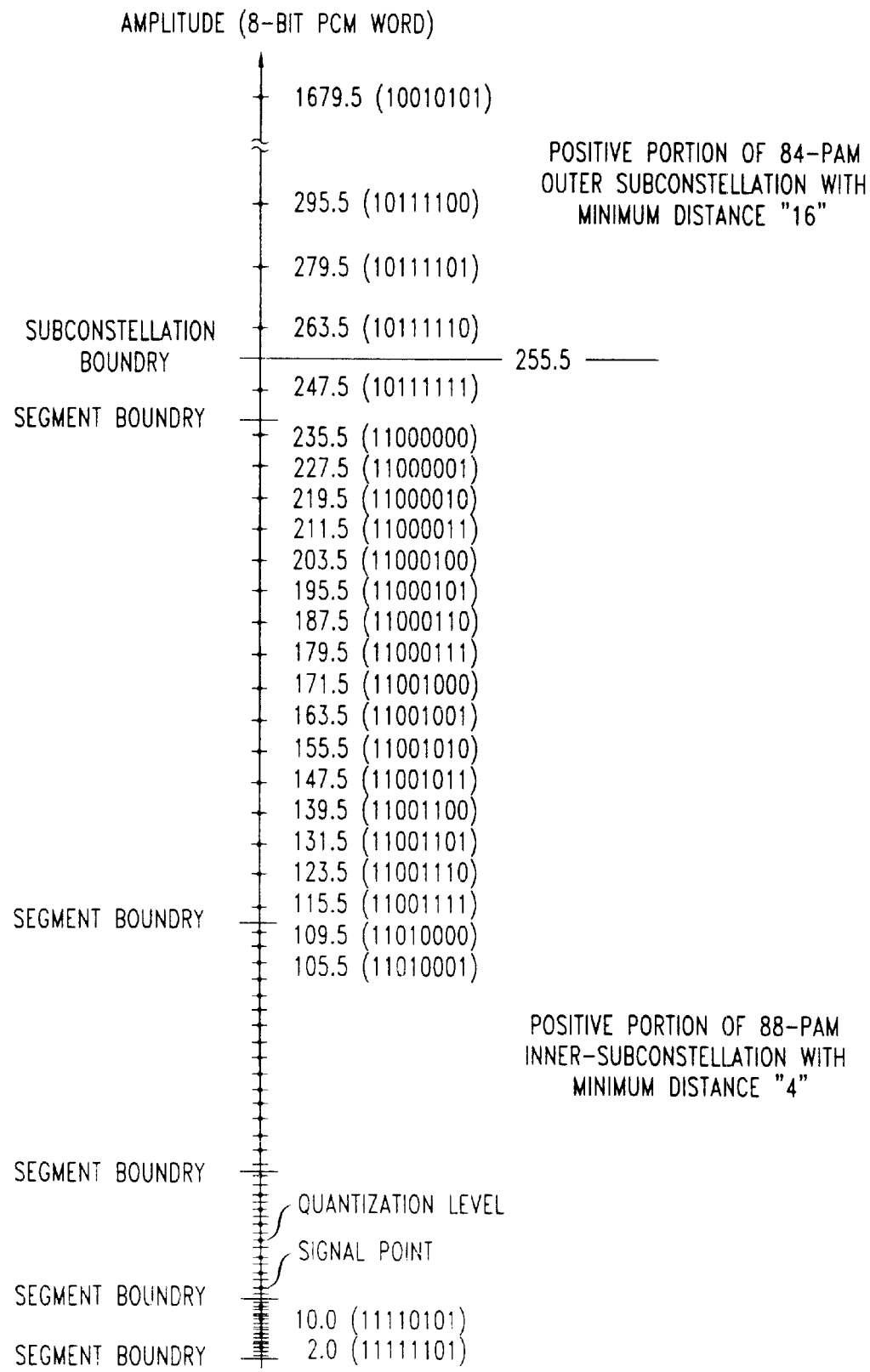
FIG. 3 shows a portion of another illustrative PCM-derived signal constellation, the complete constellation being shown in Appendix I.

However, I have recognized that it is advantageous to include in the inner sub-constellation a large number of signal points whose distance is greater than its minimum distance. Referring to the PCM-derived constellation of FIG. 3, it will be seen in contrast to FIG. 2, that the inner sub-constellation now includes signal points derived from all of the quantization levels between "115.5" and "247.5" inclusive. In particular, as described in the parent hereof, I have recognized that it is advantageous to relocate the boundary between the inner and outer sub-constellations to an amplitude position which is as high as possible consistent with the power constraint, the data rate requirement and constraints on the size of the inner constellation caused by the characteristics of the code (e.g., an equal number of signal points in each so-called subset of the inner sub-constellation). In particular, the boundary between the inner and outer sub-constellations is now at "255.5". Appendix I hereof shows the entire PCM-derived constellation corresponding to the representation thereof shown in FIG. 3.

A first illustrative embodiment of the transmitter within modem 20, which implements the inventive coded modulation scheme described above, is shown in FIG. 4. In particular, scrambler 19 thereof subjects the serial stream of 56 kbps data on line 15 to a conventional scrambling (also called randomizing) operation and the resultant scrambled bit stream is converted to a sequence of N-bit words by serial-to-parallel bit converter 21. Illustratively, N=7. The seven bits of each word, denominated I1, I2, ... I7, are provided in parallel on leads 22 at a rate of 1/T per second, where T is the so-called signaling interval whose value is dictated by the PCM signaling format. In particular, T=0.125 msec, so that the so-called symbol rate, more commonly called the baud rate, is $1/(0.125 \times 10^{-3}) = 8 \times 10^3$ symbols per second, or 8 kbaud.

Various different ones of the input bit patterns are steered to respective modulators associated with the various sub-constellations of the PCM-derived constellation. In particular, when certain bit patterns of either a portion or all of the bits on leads 22 appear, the inner sub-constellation is used. In this case, lead 22 bits are steered by a switch 24 to a coded modulator 37 comprising rate-½ trellis encoder 26 and inner sub-constellation mapper 27, causing a signal point of the inner sub-constellation to be identified at the output of mapper 27.

When the other bit patterns appear on leads 22, the outer sub-constellation is used. In this case, lead 22 bits are steered to an uncoded modulator 38 comprising outer sub-constellation mapper 28, causing a signal point of the outer sub-constellation to be identified at the output of mapper 28. The outputs of mappers 27 and 28 are 8-bit words each representing the PCM quantization level from which the corresponding signal point was derived. These are applied to parallel-to-serial bit converter 31 and thence onto trunk 25 by way of switch 29, which is controlled in tandem with switch 24. Parallel-to-serial bit converter 31 generates a transmit output signal representing the selected signal points. That signal is applied to trunk 25. The bits carried by that output signal are at a rate of 64 kbps (=8 bits×8 kbaud).

More particularly, the bit patterns on leads 22 which are to be represented using the inner sub-constellation are those which meet a predetermined criterion, namely that the decimal equivalent of the input bit pattern I7, I6 ... I1 is less than a threshold R=44 (where the bits I7 through I1 are in order from most- to least-significant). In particular, when that criterion is met, comparator 23 provides an output bit of value "0", which causes switch 24 to apply bits I1 through I7 to coded modulator 37 for ultimate identification of a signal point from the inner sub-constellation. Coded modulator 37 is of standard design in which a first group of k bits—in this case comprising the single bit I1—are applied to input lead 33 of trellis encoder 26. The bit output of the latter on leads 34, comprises p>k bits. Illustratively, p=2, and the bits on leads 34 are bits X0 and X1 which are applied to constellation mapper 27, along with bits I2 through I7. Each different one of the M=88 possible bit patterns at the input of constellation mapper 27 identifies one of the 88 signal points of the inner sub-constellation, the specific illustrative mapping being shown in Appendix I and being described in further detail hereinbelow. For the present it may be be noted that, pursuant to conventional trellis encoding practice, each trellis-encoded signal (comprising the bit pair X0, X1) of the sequence of such signals generated by trellis encoder 27 identifies a respective one of four signal point subsets of the inner sub-constellation—with each different value of the trellis-encoded signal (i.e., 00, 01, 10, and 11) identifying a different one of the subsets—whereas a particular signal point of the identified subset is selected as a function of another portion of the input data, in this case bits I2 through I7.

By contrast, the bit patterns on leads 22 which are to be represented using the outer sub-constellation are those which do not meet the aforementioned criterion, that is, those for which the decimal equivalent value of I7, I6, ... I1 is greater than or equal to the threshold R. In that case, comparator 23 provides an output bit value of "1" which causes switch 24 to apply bits I1 through I7 to uncoded modulator 38 for ultimate identification of a signal point from the outer sub-constellation. It can be verified that there are 84 (=128−44) possible bit patterns at the input of constellation mapper 28, each of those patterns identifying one of the L=84 signal points of the outer sub-constellation as is, again, shown in detail in Appendix I.

The output bit of comparator 23 also controls the operation of trellis encoder in that the so-called state of the trellis encoder—which is illustratively implemented as a finite state machine—is advanced in response to the signals on its input lead only when switch 24 is in the "down" position and is therefore providing a new value of bit I1 at the input of the trellis encoder.

The effective minimum distance of "15" for the overall PCM-derived constellation achieved in this embodiment of the invention is to be compared to the effective minimum distance that is achieved in accordance with prior art practice at the same data rate of 56 kbps. In particular, encoding the 7 bits per baud in order to support a 56 kbps bit stream without any trellis-coded modulation would require a $2^7=128$-point PCM-derived constellation. The best such constellation would have an actual and effective minimum distance of "8." Using the constellation of FIG. 2 as taught in my above-cited '351 patent application secures a significantly higher level of error rate performance than such a prior art arrangement—5 dB higher at the 56 kbps rate. And as noted in the parent hereof, using the constellation of FIG. 3/Appendix I achieves yet an additional 0.7 dB improvement in error rate performance.

Figure 5:
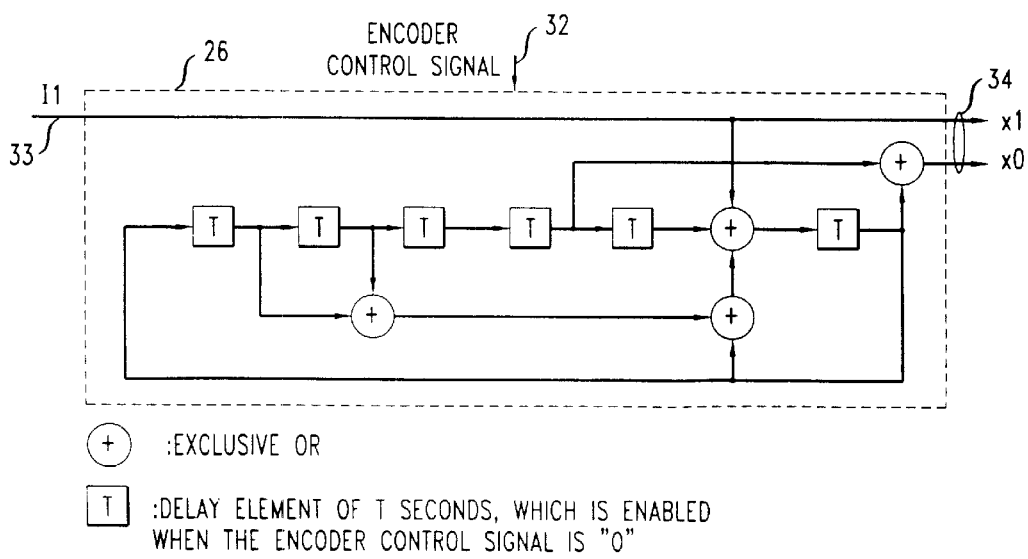
FIG. 5 shows an illustrative embodiment for a trellis encoder used in the modem of FIG. 4.

FIG. 5 shows an illustrative embodiment of a finite state machine for implementing trellis encoder 26. (This is my preferred way implementing the trellis code and corresponds to FIG. 4 of my above-cited '351 patent application. If desired, the implementation shown in FIG. 5 of that patent application could be used instead.) In particular, the trellis encoder of FIG. 5 is a systematic encoder—which means that its input bit stream on lead 33 is carried directly to the encoder output as one of output bits X1 on one of leads 34. Modem designers often prefer to use a systematic code because it is possible, should it be desired for any reason, to recover the transmitted bit(s) that were applied to the trellis encoder without carrying out any decoding in the receiver (albeit without thereby realizing the enhanced noise immunity afforded by the use of the code in the first place). The other one of leads 34 carries redundant bit X0, which is generated by the logic circuit shown in the figure comprised of six T-second delay elements and four exclusive-OR gates, where T is the aforementioned signaling interval. As noted earlier, the operation of the trellis encoder 26 is controlled by the signal on lead 32 in the sense that its state—given by the contents of its six delay elements—is changed in response to the signals on input lead 33 only when switch 24 of FIG. 4 is in the "down" position and is therefore providing a new value of bit I1 at the input of the trellis encoder.

Appendix I shows one illustrative way in which the bits applied to constellation mappers 27 and 28 are mapped into signal points of the PCM-derived constellation. When mapped by constellation mapper 28 into signal points of the outer sub-constellation, the various combinations of the values of the bits I1, I2, I3, I4, I5, I6 and I7 can be assigned to the signal points in any convenient way. In the present embodiment, Gray coding is used in order to minimize the number of bit errors which occur when a signal point error occurs.

The coding scheme described hereinabove assumes a −9 dBm constraint on the average transmitted signal power in the telephone line. However, a tighter power constraint, such as −12 dBm, may have to be met. The embodiment of FIG. 6, which employs the PCM-derived constellation shown in Appendix A, satisfies that tighter power constraint at a cost of a slightly lower data rate of 54 kbps rather than 56 kbps with about the same level of error rate performance.

Figure 4:
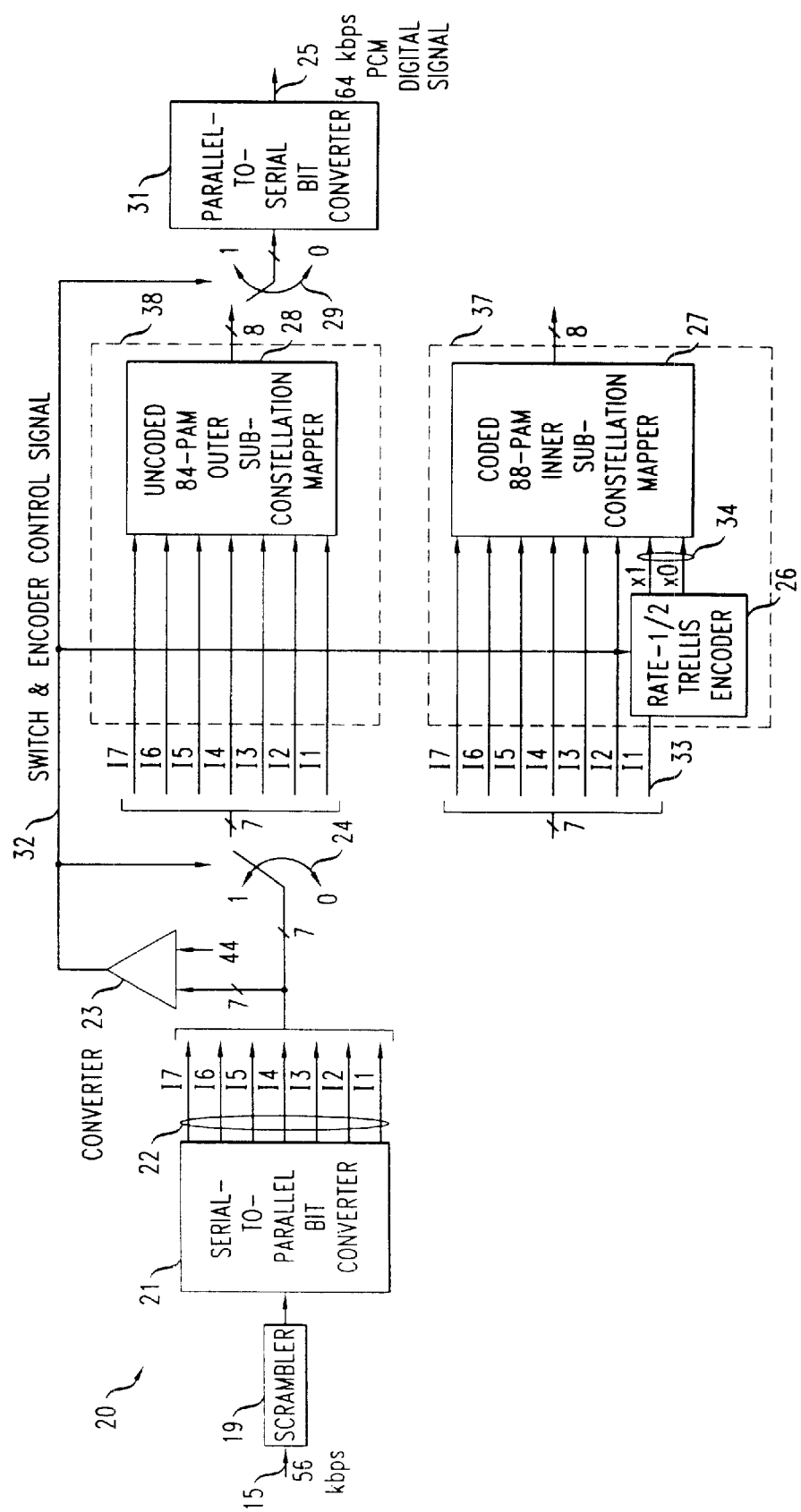
FIG. 4 is a block diagram of the first illustrative embodiment for the transmitter within the transmitting modem of the telecommunications system of FIG. 1 using the constellation of FIG. 3/Appendix I.
Figure 6:
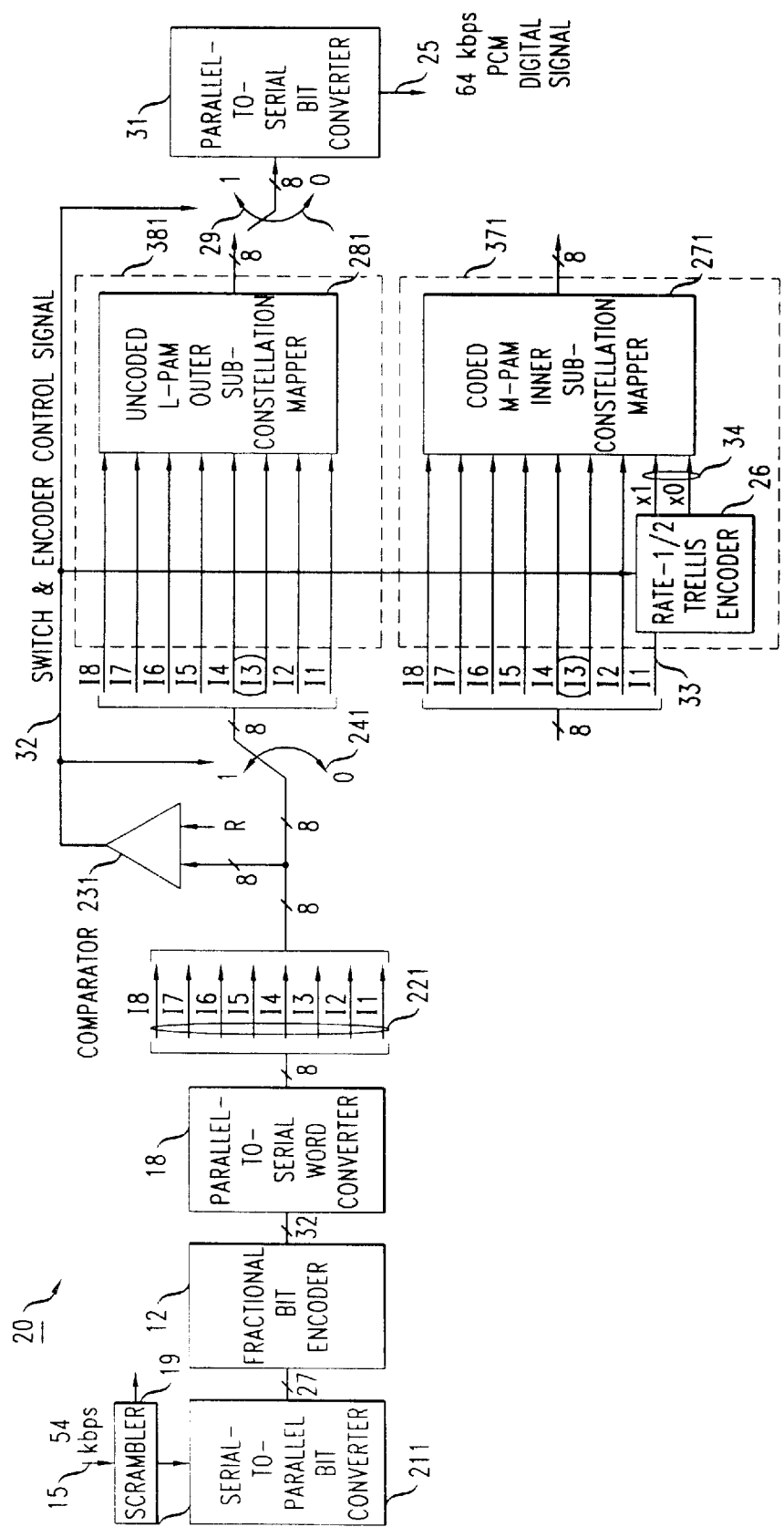
FIG. 6 shows an alternative embodiment for the transmitting modem of the telecommunications system of FIG. 1 using, for different applications, any of the constellations shown in Appendices II through V.

The embodiment of FIG. 6 is similar to that shown in FIG. 4 with but a few modifications. Indeed, the similarity among the various embodiments shown and described herein permits combining them into a single modem easily and cost-effectively in order to implement various fallback data rates as needed. In the constellation of Appendix II, the inner sub-constellation still has M=88 signal points, with a minimum distance of "4". The outer sub-constellation has L=76 signal points, with a minimum distance of "16". The trellis coding provides an effective minimum distance for the inner sub-constellation of "15." And, again, the bits are Gray-coded to at least some extent.

Figure 7:
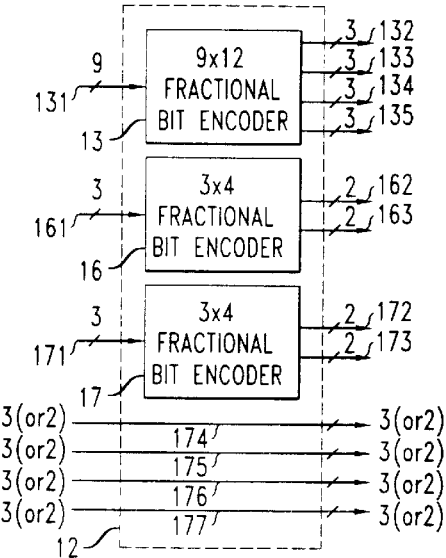
FIG. 7 is a block diagram of a fractional bit encoder used in the transmitting modem of FIG. 6 when the constellations of Appendices II and III are used.

The bit rate on line 15 of 54 kbps is equivalent to a fractional bit rate of 6.75 bits per signaling interval, as compared to the integral bit rate of 7 bits per signaling interval provided by the embodiment of FIG. 4. In order to accommodate this fractional bit rate, the embodiment of FIG. 4 includes a fractional bit encoder 12, the details of which are shown in FIG. 7. In particular, fractional bit encoder 12 receives 27 bits over four successive signaling intervals, which are provided in parallel form at the output of serial-to-parallel bit converter 211—9 bits on leads 131 and 3 bits on each of leads 161, 171, 174, 175, 176 and 177. (The indication in the FIG. that each of leads 174 through 177 may receive 2 bits rather than 3 should be ignored for the present.) The 9 bits on leads 131, are processed by 9×12 fractional bit encoder 13 in order to generate four 3-bit words on leads 132 to 135, respectively. The three bits on leads 161 (171) are processed by 3×4 fractional bit encoder 16 (17) to generate two 2-bit words on leads 162 and 163 (172 and 173). Over four successive signaling intervals, parallel-to-serial word converter 18 provides 8-bit output words, comprising bits I1 through I8 on leads 221 in the following way:

In the first of the signaling intervals, the bits on lead 132 (reading from bottom to top) are used as bits I4, I5 and I8; the bits on lead 162 (also reading from bottom to top) are used as bits I6 and I7; and the bits on leads 174 are used as bits I1, I2 and I3. (The parenthesis surrounding I3 in FIG. 6 should be ignored for the present.) In the second of the four signaling intervals, the signals on leads 133, 163 and 175 take the place of the signals on leads 132, 162 and 174, respectively. In the third of the four signaling intervals, the signals on leads 134, 172 and 176 take the place of the signals on leads 132, 162 and 174, respectively. And in the fourth of the four signaling intervals, the signals on leads 135, 173 and 177 take the place of the signals on leads 132, 162 and 174, respectively.

Fractional bit encoders 13, 16 and 17 could each be implemented via a respective look-up table. Such a table would be relatively small in the case of 3×4 fractional bit encoders 16 and 17, but relatively large in the case of 9×12 fractional bit encoder 13. Advantageously, however, the functionality of one or both types of encoders (as indeed with most of the functional blocks shown in the various FIGS.) could be, and in preferred embodiments, actually is, implemented via one or more appropriately programmed signal processors. In that context, the operation of the two types of fractional bit encoders can be understood as follows:

Looking first at the 9 input bits applied to encoder 13 on lead 131, the value of one of those bits (e.g., the lowest bit) is used to decide whether any of the 3-bit patterns on any of leads 132 through 135 will be 001. In particular, if that bit value is 0, then none of those bit patterns will be 001. Rather, the bit pattern on each of leads 132 through 135 will be xy0, where x and y are an associated two of the remaining 8 bits on lead 131. On the other hand, if that bit value is 1, then the values of two of the other bits on lead 131 are used to select a particular one of the output leads 132 through 135 as being the one to carry the bit pattern 001 and the bit patterns on each of the other three of those output leads will be xy0, where x and y are an associated two of the remaining 6 bits on lead 131.

Looking at the 3 input bits applied to encoder 16 on lead 161, the value of one of those bits (e.g., the lowest bit) is used to decide whether any of the 2-bit patterns on either of leads 162 and 163 will be 01. In particular, if that bit value is 0, then neither of those bit patterns will be 01. Rather, the bit pattern on each of leads 162 and 163 will be x0, where x is an associated one of the remaining 2 bits on lead 161. On the other hand, if that bit value is 1, then the values of one of the other bits on lead 161 is used to select a particular one of the output leads 162 and 163 as being the one to carry the bit pattern 01 and the bit pattern on the other one of those output leads will be x0, where x is the remaining bit on lead 161.

The operation of encoder 17 is identical to that of encoder 16.

The embodiment of FIG. 6 includes a comparator 231 which, like comparator 23, compares its input bit pattern to decimal threshold R=44, but differs in that it receives 8-bit input pattern I1 through I8 rather than a 7-bit pattern. It can be verified that a total of 120 different bit patterns can be assumed by the 8 bits on leads I1 through I8. Of these, all 44 bit patterns having a decimal equivalent of 0 through 43 actually appear and are steered to coded modulator 371, which includes trellis encoder 26 and inner sub-constellation mapper 271. This leaves 76 bit patterns of the 120 whose decimal equivalent is 44 or greater. As a result, modulator 381 includes outer sub-constellation mapper 281, each of whose input bit patterns identifies a respective one of the 76 signal points of the outer sub-constellation. The bits on leads 221 are delivered to modulators 371 and 381 via switch 241.

Another point to be made is that the fractional bit encoding scheme described above was designed in such a way that bit patterns which appear with greater probability than other bit patterns are represented by signal points with lower energies, thus reducing the average transmitted signal power over what it would otherwise be. Thus, for example, each of the bit patterns which have decimal equivalent values of less than 44 and are thus steered to the relatively low energy signal points of the inner sub-constellation have a probability of approximately 0.01, whereas the other bit patterns, which are steered to the relatively high energy signal points of the outer sub-constellation have probabilities which range from approximately 0.01 to 0.004. In assigning particular bit patterns to particular signal points of the outer sub-constellation, those which occur with greater probability are assigned to the lower energy signal points.

In the embodiment of FIG. 6, as in all of the embodiments herein, the coding and selection of signal points from the inner and outer sub-constellations are independent of one another. That is, the words on leads 221 with value less than R affect exclusively the selection of inner sub-constellation signal points and the words on leads 221 with value greater than or equal to R affect exclusively the selection of outer sub-constellation signal points. The fact that, because of the operation of fractional bit encoder 12, the various words on leads 221 may have been generated interdependently does not negate the fact that those words—which can be regarded as the "input data" for the modulators—independently select the inner and outer sub-constellation signal points.

Some PCM links, at least in North America, utilize so-called bit robbing in order to provide an in-band signaling channel for signaling and maintenance purposes. In particular, for one out of every six of the 8-bit words representing the various PCM quantization levels, the least significant bit of that word is pre-empted by the telephone network to implement that in-band channel. As shown in FIG. 8, each 8-bit word communicated from transmitting modem 20 comprises (from least-to most-significant) bits $b_0$ through $b_7$. For every group of six successive such words, bit $b_0$ of the (illustratively) fourth word is pre-empted, or "robbed" by telephone network 40 and appears at far-end central office 50 as bit $c_0$. In practical effect, this means that there is a 50% chance that a different word than the one that was transmitted will be received at the far-end central office. The mapping between the 8-bit patterns and the various PCM quantization levels is such that when this occurs, the quantization level that is identified by the modified 8-bit word is adjacent to the original quantization level. From the standpoint of voice communications, this substitution of one quantization level for an adjacent one is not noticeable to the listener. However, it has potentially much greater impact, for data communication because unless some mechanism is in place to compensate for this effect, there will be a very large, perhaps catastrophic, impact on the bit error rate. Indeed, it is possible that within different PCM links involved in a particular connection, the bit robbing may be applied to different ones of the 8-bit words, thereby making this problem all the worse.

The bit-robbing phenomenon is accommodated in this embodiment by doing the following for those signaling intervals when bit robbing occurs: a) utilizing a different PCM-derived constellation, and b) encoding one fewer input bit (e.g., 5.75 rather than 6.75). Those signaling intervals occur deterministically, i.e., the bit-robbed and non-bit-robbed intervals have a predetermined timing relationship. That is, they are interleaved in a way which can be ascertained a priori, and which does not depend on the values of the input data but only on the equipment within the channel. The bit-robbed signaling intervals can be identified by, for example, having the receiving modem examine the signal points received during an initial training period, deducing which of the signaling intervals were subject to bit robbing based on when the received signal points are other than what was expected. and conveying that information to the transmitting modem.) As shown in FIG. 8, for those signaling intervals when bit robbing does not occur, a first PCM-derived constellation designed following the principles described above—illustratively the constellation of Appendix II—is used, whereas for those signaling intervals when bit robbing does occur, a second, different PCM-derived constellation embodying the principles of the invention is used—illustratively the constellation shown in Appendix III discussed below. In accordance with the present invention, only one trellis encoder is used across all of the signaling intervals, both bit-robbed and non-bit-robbed. That is, when bit robbed signaling intervals occur, the input bit or bits to be trellis encoded are simply applied to the same trellis encoder that was receiving such bits during the non-bit-robbed signaling intervals. An alternative would be to use two separate trellis encoders, one for the bit-robbed signaling intervals and one for the non-bit-robbed signaling intervals. Such an approach, however, will engender significantly more decoding delay in the receiver because a particular number of signal points transmitted during the bit-robbed signaling intervals—equal to the so-called decoding depth—would have to be received before a decoding decision can be made, thus increasing the decoding delay by six-fold, for example, in the case where bit robbing occurs once every six signaling intervals.

Thus, just as for the non-bit-robbed signaling intervals, each trellis-encoded signal (comprising the bit pair X0, X1) of the sequence of such signals generated by trellis encoder 27 identifies one of four signal point subsets of the inner sub-constellation, with each different value of the trellis-encoded signal identifying a different one of the subsets.

However, the inner sub-constellation is different for the bit-robbed and non-bit-robbed signaling intervals, and thus the subsets identified by the trellis-encoded signals are different. In particular, the subsets of the inner sub-constellation used in the bit-robbed signaling intervals comprise fewer signal points.

In Appendix III, the quantization levels marked with an "x" are used as the signal points of the transmitter constellation. The next-higher quantization level, not marked with an "x", is the level to which the transmitted level may be converted in the receiver due to bit robbing, as just mentioned. The minimum distance between the quantization levels of two adjacent such pairs, taken over all pairs within a particular sub-constellation, is the minimum distance of the sub-constellation. Thus, for example, one of the pairs of quantization levels of the inner sub-constellation comprises 2.0 and 3.0 and another one of the pairs is –2.0 and –3.0. The minimum distance between these pairs is the distance between 2 and –2, which is "4". The inner sub-constellation comprises 48 pairs, and the minimum distance of the entire inner sub-constellation is, in fact, "4". It can similarly be verified that among the 36 pairs of the outer sub-constellation, the minimum distance is "16".

As can be seen from Appendix III, each quantization level pair represents a particular one bit pattern. Thus, for example, the pair of 2.0 and 3.0 amplitudes 2 and 3 represents the pattern 00010000. Thus even when a transmitted quantization level is converted in the receiver to the other quantization level of its pair due to bit robbing, the correct bit pattern can still be recovered. In the receiver, the decoding process for identifying the sequence of transmitted signal points proceeds in the conventional way, with the exceptions that: (a) with respect to the inner sub-constellation, the subset to which transmitter signal points ("x") belong is regarded in the receiver as also including the signal points with which the transmitted signal points are paired; and (b) the outer-sub-constellation includes both the transmitter signal points ("x") and their paired signal points. Thus, for example, 2 and 3 belong to the same subset of the inner-sub-constellation.

In order to see how transmitter 20 of FIG. 6 is configured during a bit-robbed signaling interval, we first refer back to FIG. 7. It will be recalled that for each of four successive signaling intervals, the bits on one of the leads 174 through 177 are applied to parallel-to-serial word converter 18. For non-bit-robbed signaling intervals, 3 bits are applied to the appropriate one of those leads. However, for bit-robbed signaling intervals, only 2 bits are applied to those of leads 174 through 177 whose bits will be used during a bit-robbed signaling interval. Those two bits are I1 and I2 of FIG. 6, there being no I3 at this time, as denoted by the parenthesis surrounding I3 in the FIG. Thus the binary word on leads 221 comprises the bits I8, I7, I6, I5, I4, I2 and I1 and its decimal equivalent value is compared by comparator 231 to a new threshold R=24. And, consistent with Appendix III, constellation mappers 271 and 281 now have M=48 and L=36, respectively.

Another phenomenon to be accounted for is a digital attenuation which is sometimes implemented in the far-end central office in order to ensure that the signal applied to local loop 58 does not exceed desired power levels. When that digital attenuation is implemented, each received 8-bit word representing a PCM vocoder quantization level is mapped to a different 8-bit word representing another PCM vocoder quantization level which is lower—for example, by 3 dB—than the original level. The overall effect of this conversion is to establish as the set of levels that can be communicated over the local loop a reduced set of the 255 quantization levels namely the set of levels to which the transmitted levels are connected. Moreover, the transmission of any particular 8-bit word from the near-end modem will result in the transmission over the local loop of a different level than would have been the case without the digital attention.

In order to account for this digital attenuation, one needs to design the PCM-derived constellation with the desired distance properties using only the reduced set of quantization levels. Moreover, the assignment in the transmitter of 8-bit patterns to the selected quantization levels will not be as before but, rather, will take into account the aforementioned digital attenuation mapping so that after the received 8-bit word has been converted in the far-end central office in the digital attenuation process, the converted 8-bit word corresponds to the desired quantization level.

Such a constellation and its mapping are shown in Appendix IV. As shown, the actual constellation signal points associated with the various 7- or 8-bit input patterns—denoted "Amplitude of Signal Point after 3 dB Digital Attenuation"—are taken from the reduced set of quantization levels. For example, 543.5 is such a level, which is desired to be communicated over the local loop when the input bit pattern is 1010101. However, in order to cause that level of 543.5 to be applied to the local loop, it is necessary, as shown in the column denoted "Amplitude of Signal Point before 3 dB Digital Attenuation", to transmit the 8-bit word that represents the quantization level at 767.5, which happens to be 10100111, because that 8-bit word will be converted by the digital attenuation process into the 8-bit word which represents the quantization level at 543.5, which happens to be 10101110.

In order to continue to meet a –12 dBm power constraint and have essentially the same overall error rate performance in this environment, it may be necessary to lower the data rate somewhat because certain useful quantization levels are not included in the reduced set and the use of other quantization levels that would be available as replacements would cause the power constraint to be violated. Accordingly, a set of quantization levels which continues to allow the power constraint to be met may result in a smaller PCM-derived constellation and thus a lower data rate. The constellation of Appendix IV does indeed meet the –12 dBm power constraint and exhibits a performance comparable to the constellation of Appendix II. However, it supports a reduced data rate of 52 kbps, which corresponds to a bandwidth efficiency of 6.5 bits per signaling interval. In order to implement this scheme, one could use the arrangement of FIG. 6 modified to a) include the fractional bit encoder shown in FIG.7 of my above-cited '351 patent application, b) use 7-bit words on leads 221, and c) have R=40, M=80 and L=56.

Certain environments may include both bit robbing and digital attenuation. For such a case, one may use the constellation of Appendix IV during the non-bit-robbed intervals and the constellation of Appendix V during the bit-robbed intervals. The constellation of Appendix V was designed following the methodologies set forth above to account for both the bit robbing and the digital attenuation. As can be seen, it may turn out that the pair of signal points representing a particular input bit pattern reduces to only a single signal point in the receiver, as, for example, the case of input bit pattern 101000, which is represented by the single signal point 511.5. When the constellation of Appendix V is used, the fractional bit encoder could again be that shown in FIG. 7 of my above-cited '351 patent application but with bit I3 eliminated, and in FIG. 6, R=22, M=44, and L=26.

Figure 9:
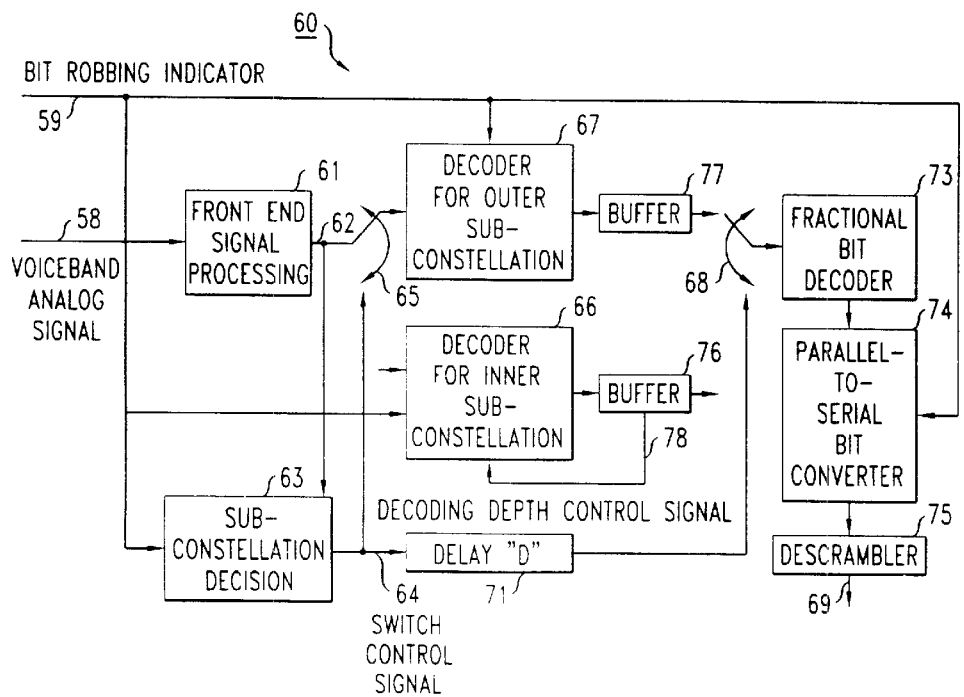
FIG. 9 is a block diagram of an illustrative embodiment for the receiving modem used in the telecommunications system of FIG. 1.

FIG. 9 is a block diagram of an illustrative embodiment for receiving modem 60 of FIG. 1. In particular, the voice-band analog signal on local loop 58 is applied to front-end signal processing unit 61 which performs such conventional types of processing as automatic gain control, timing recovery, analog—to-digital conversion and equalization. The latter two operations, more particularly, could be as described in U.S. Pat. No. 5,394,437 issued Feb. 28, 1995 and 5,578,625 issued Jan. 18, 1996, to Ayanoglu at al., both hereby incorporated by reference. The output of processing unit 61 on lead 62 is a sequence of channel-impaired signal points each of whose amplitudes is represented by some appropriate number of bits greater than 8. Those signal points are applied to sub-constellation decision unit 63 which, for each received signal point, decides which sub-constellation that signal point originated from. Since the boundary between the inner and outer sub-constellations may be different in the bit-robbed and non-bit-robbed signaling intervals, the sub-constellation decision is made based on the signal point amplitude and a bit robbing indicator which is provided on lead 59. (That indicator is provided by circuitry (not shown) within the receiver which has "learned" which signaling intervals are bit-robbed signaling intervals as described hereinabove.) Since the minimum distance between the sub-constellations in this embodiment is not less than the effective minimum distance of each of the sub constellations of the PCM-derived constellation, this sub-constellation decision is no less reliable than decisions ultimately to be made about which signal point of any particular sub-constellation may have been transmitted at any particular point in time.

The control signal on control lead 64 at the output of sub-constellation decision unit 63 identifying the sub-constellation controls switch 65 so as to steer the received, channel-impaired signal points to the appropriate one of decoders 66 and 67. In particular, decoder 66 comprises a so-called maximum—likelihood decoder—illustratively a Viterbi decoder—which is adapted to recover, and provide at its output, the 6, 7, or 8 data bits I1, I2, (I3), I4 , . . . , I7 (I8) that were steered to the coded modulator in the transmitter modem. Each successive 6-, 7- or 8-bit word thus generated is placed in a first-in-first-out (FIFO) buffer 76. Decoder 67 comprises a simple slicer which recovers, and provides at its output, a 7- or 8-bit word representing the values of data bits that were steered to the uncoded modulator in the transmitter modem. Each successive 6-, 7- or 8-bit word thus generated is placed in a FIFO buffer 77.

Since the inner and outer sub-constellations are different in the bit-robbed and non-bit-robbed signaling intervals, the bit robbing indicator in lead 59 is applied not only to sub-constellation decision unit 63, but also to decoders 66 and 67 so that the appropriate inner and outer sub-constellations are used in the decoding process.

It will of course be appreciated that in embodiments in which more than two sub-constellations are used, the receiving modem would include a corresponding number of decoders rather than only two.

The words buffered in buffers 76 and 77 are assembled onto an output stream by being steered by switch 68 in a manner to be described, to fractional bit decoder 73 and thence through parallel-to-serial bit converter 74, descrambler 75 and out onto lead 69. In those embodiments where a fractional bit encoder was not used in the transmitting modem fractional bit decoder 73 is not used. The bit robbing indicator is also applied to parallel-to-serial bit converter 74, since different numbers of bits were transmitted in bit-robbed and non-bit-robbed signaling intervals.

The manner in which switch 68 is controlled arises out of the following considerations: In the Viterbi decoding process, a decision is made as to the value of a particular received signal point only after a particular number of succeeding signal points have been received. That number of signal points is referred to as the decoding depth. For the trellis code used in the disclosed embodiments, a decoding depth of 43 signal points can be used. Thus at a very minimum, a delay of at least 43 signal points must be provided between the appearance of a received signal point on lead 62 and the application of the corresponding recovered data bits to switch 68. Indeed, to provide such a delay, delay element 71 having a delay D is provided between sub-constellation decision unit 63 and switch 68 so that the movement of switch 68 between its "up" and "down" positions will mirror exactly that of switch 65, but delayed by D signaling intervals. Not all of the received signal points originate from the inner sub-constellation, however. Thus the delay D must be set to a sufficiently large value that there is a very high probability that at the time that switch 68 is in the "down" position, an output from decoder 66 is available in buffer 76. Although that probability is somewhat different for the different illustrative constellations disclosed herein a value of D=127 can be used for all of the embodiments disclosed herein with satisfactory results.

As is well known, a bandlimiting filter (not shown) typically present in PCM vocoder 55 within far end central office 50 will introduce a certain amount of intersymbol interference (ISI) in the signal on local loop 58. This can be dealt with by introducing so-called stuffing bits into the 64 kbps PCM digital signal on lead 25, thereby cutting down on the usable "payload" that can be carried by that signal. This, in turn, cuts down on the data rate that can be supported for the data supplied by server 10. For example, if the stuffing bit rate is 8 kbps, then the usable payload is 56 kbps. Since each signal point of the PCM-derived constellations used herein is represented by 8 bits, the input to parallel-to-serial bit converter 31 is limited to a rate of 7K signal points per second. Since each signal point represents 7 user data bits in, for example, the embodiment of FIG. 4, the data rate supportable on line 15 would be 49 kbps rather than 56. Of course, if some other approach is taken to compensate for this ISI, the full 64 kbps can be used for the payload. Similar considerations apply for the embodiment of FIG. 6.

The above discussion has been directed to "downstream" communications from the computer server to the end user terminal. Achieving communications in the reverse, "upstream" direction using a PCM-derived constellation at the high data rates achieved in the downstream direction is a more difficult problem because local loop 58 is an analog line whose loss and other characteristics are not known. For further discussion on this issue, one may refer to my above-cited '351 patent application.

A number of variations are possible. For example, in some implementations of bit robbing within the telephone network, the bit robbed bit may, at some point along the transmission path, be deterministically mapped to a particular one bit value, e.g. "1". If it is known that this will be taking place—so that it is guaranteed that only one of the two signal points of each pair of signal points representing a particular input bit pattern will arrive at the receiving modem—then constellations such as those shown in Appendices III and V can still be used, but the decoder can be configured as though no bit robbing occurs, e.g., configured as discussed above vis-a-vis the constellations of Appendices I, II and IV. Moreover if, again, it is known that this will be taking place, the transmit constellation can be designed differently than as described above. In particular, the constellation will be appropriately configured as long as the distance between the signal points that are actually received meets the desired minimum distance parameters of the inner and outer sub-constellations, such as "4" and "16". (The distances between pairs of signal points representing a particular bit pattern is no longer an issue.) This may then allow for a slightly reduced transmitted signal power or a slightly increased data rate.

If the present invention, and/or the inventions disclosed in my above-cited '351 patent application and the parent application hereof, are used in an environment in which the transmitted signal experiences significant intersymbol interference (such as when there is deep attenuation within the signal band), it is desirable to implement within the receiving modem a joint Viterbi decoder and decision feedback equalizer of the type shown and described in my co-pending U.S. patent application Ser. No. 08/936,649, filed of even date herewith and entitled "Joint Viterbi Decoder and Decision Feedback Equalizer," which claims priority from my provisional U.S. patent application Ser. No. 60/051561 which was filed on Jul. 2, 1997, both hereby incorporated by reference.

The foregoing is merely illustrative. Thus for example, it will be appreciated by those skilled in the art that the block diagrams herein represent conceptual views of illustrative circuitry embodying the principles of the invention. The functions of the various elements shown in the FIGS. would, in preferred embodiments, be implemented by one or more programmed processors, digital signal processing (DSP) chips, or the like rather than individual hardware elements. Similarly, the switches shown in the FIGS. are conceptual only. Their function would typically be carried out through the operation of program logic.

In the claims hereof any element expressed as a means for performing a specified function is intended to encompass any way of performing that function including, for example, a) a combination of circuit elements which performs that function or b) software in any form (including, therefore, firmware, microcode or the like) combined with appropriate circuitry for executing that software to perform the function. The invention is defined by such claims resides in the fact that the functionalities provided by the various recited means are combined and brought together in the manner which the claims call for. Applicant thus regards any means which can provide those functionalities as equivalent as those shown herein.

In the illustrative embodiments shown herein the redundancy, e.g., trellis, encoding function precedes the constellation mapping function. However, it is possible to achieve an equivalent overall encoding/mapping functionality in an arrangement in which the order is reversed as, for example, is the case in the V.34 modem standard. The structure of the trellis encoder will different from that shown herein in order to take account of the reversed order of operations and the redundancy-encoded signals will be different depending on whether the redundancy encoding occurs before the mapping, as in the present embodiments, or after it. The present invention is equally applicable to such arrangements.

In the embodiments disclosed herein, the same fractional bit encoder is used for the bit-robbed and non-bit-robbed signaling intervals. If desired, however, different fractional bit encoders could be used in order to maximize the data rate for both types of signaling intervals while still meeting various constraints and desired error rate performance. In such embodiments, fractional rate decoder 73 would receive the bit robbing indicator on lead 59 and in response thereto would perform the provide appropriate fractional rate decoding—with appropriate buffering—for the two types of intervals.

As noted above, the switches shown in the FIGS. are conceptual only. In particular, one way of achieving the operation described above vis-a-vis the operation of switch 68 would be to a) eliminate delay element 71 and b) constitute buffer 77 as a first-in/first-out buffer capable of storing the data for D signaling intervals. Whenever the signal on lead 64 indicates the reception of a signal point from the outer sub-constellation, the output of decoder 67 is applied to buffer 77. Whenever the signal on lead 64 indicates the reception of a signal point from the inner sub-constellation, invalid data is inserted into buffer 77, i.e., data having a value which is never generated by decoder 67. As data is read out of buffer 77, it is applied to fractional bit decoder 73 (or parallel-to-serial bit converter 74 if decoder 73 is not used) if the data has a valid value. Whenever an invalid value is encountered at the output of buffer 77, data is taken from buffer 76 instead and substituted for the invalid data in the stream applied to decoder 73 (or converter 74).

In all of the embodiments shown herein, the actual minimum distance of the inner (outer) sub-constellation is the same—namely "4" ("16"). However, depending on the anticipated channel conditions for a given application, coding schemes involving sub-constellations with different minimum distances could be implemented in order to support different bit rates while meeting the desired error rate performance criteria It should also be appreciated that the invention is applicable to arrangements in which all of the transmitted signal points are encoded, i.e., arrangements which use a single constellation for the non-bit-robbed signaling intervals and a single constellation for the bit-robbed intervals, with no sub-constellations being involved.

Although certain signal paths in FIG. 1, such as 25, 35 and 45, are depicted as carrying only a single 64 kbps stream, this, too, is a conceptual view. Those skilled in the art will appreciate that telephone transmission facilities typically comprise high-capacity signal paths supporting a number of different multiplexed data streams, one of which would be the particular 64 kbps signal stream described herein as originating from transmitting modem 20.

If desired, in order to enhance the overall system's immunity to so-called correlated noise, including so-called bursty noise, a signal point interleaver of known design can be inserted before parallel-to-serial bit converter 31 and a corresponding signal point de-interleaver can be inserted at the output of front-end signal processing unit 61. Such an interleaver/de-interleaver may be of the general type shown, for example, in my U.S. Pat. No. 5,056,112 issued Oct. 8, 1991.

The trellis-coded modulation used in the illustrative embodiments is one-dimensional trellis-coded modulation using a particular 64-state code. However, the invention can be implemented using different trellis codes and/or more-than-one-dimensional (multi-dimensional) coded modulation. As is well known, multi-dimensional modulation may be implemented by representing each so-called channel symbol as a succession of individually transmitted one- or two-dimensional (e.g., QAM) signal points. The latter can be represented as complex quantities having an amplitude and phase. A problem that would need to be overcome if one were to use multi-dimensional coded modulation is that if mistake is made in the receiver as to whether a particular received signal point is from the inner or outer sub-constellation, successive groups of signal points loaded into buffer 76 will not appear in appropriate channel symbol groupings and the-decoding will not be able to proceed without some type of re-synchronization. This is a principal reason why the preferred embodiments herein use one-dimensional coded modulation.

It is anticipated that the transmitting and receiving modems may well be in different countries-one of which may use μ-law encoding in its telecommunications network and the other of which may use A-law encoding. Optimal implementation of the invention would involve use of a PCM-derived constellation which is based on the type of encoding that is used at the receiving end of the channel. Thus if such international communications are envisioned, the transmitting modem would preferably be capable of encoding the transmitted data using a PCM-derived constellation based on either μ-law or A-law encoding. If, for example, end user terminal 70 initiates the connection, the originating country could be identified at modem 20 from the country code included in the originating telephone number delivered as the so-called ANI. Those in the art will be able to identify other ways by which to identify the country in which the receiving modem is located—and thus determine whether a μ-law- or A-law-derived PCM-derived constellation should be used.

It will thus be appreciated that those skilled in the art will be able to devise numerous arrangements, which although not explicitly shown or described herein, embody the principles of the invention and are within its spirit and scope.

APPENDIX I

| I7 | I6 | I5 | I4 | I3 | I2 | X1 | X0 | Amplitude of Signal Point | |
|---|---|---|---|---|---|---|---|---|---|
| 1 | 0 | 1 | 0 | 1 | 0 | 1 | — | 1,679.5 | Positive Portion of |
| 1 | 0 | 1 | 0 | 1 | 1 | 1 | — | 1,615.5 | Uncoded 84-PAM |
| 1 | 0 | 1 | 0 | 0 | 1 | 1 | — | 1,551.5 | Outer Subconstellation |
| 1 | 0 | 1 | 0 | 0 | 0 | 1 | — | 1,487.5 | |
| 1 | 0 | 1 | 1 | 0 | 0 | 1 | — | 1,423.5 | |
| 1 | 0 | 1 | 1 | 0 | 1 | 1 | — | 1,359.5 | |
| 1 | 0 | 1 | 1 | 1 | 1 | 1 | — | 1,295.5 | |
| 1 | 0 | 1 | 1 | 1 | 0 | 1 | — | 1,231.5 | |
| 1 | 0 | 0 | 1 | 1 | 0 | 1 | — | 1,167.5 | |
| 1 | 0 | 0 | 1 | 1 | 1 | 1 | — | 1,103.5 | |
| 1 | 0 | 0 | 1 | 0 | 1 | 1 | — | 1,039.5 | |
| 1 | 0 | 0 | 1 | 0 | 0 | 1 | — | 991.5 | |
| 1 | 0 | 0 | 0 | 0 | 0 | 1 | — | 959.5 | |
| 1 | 0 | 0 | 0 | 0 | 1 | 1 | — | 927.5 | |
| 1 | 0 | 0 | 0 | 1 | 1 | 1 | — | 895.5 | |
| 1 | 0 | 0 | 0 | 1 | 0 | 1 | — | 863.5 | |
| 1 | 1 | 0 | 0 | 1 | 0 | 1 | — | 831.5 | |
| 1 | 1 | 0 | 0 | 1 | 1 | 1 | — | 799.5 | |
| 1 | 1 | 0 | 0 | 0 | 1 | 1 | — | 767.5 | |
| 1 | 1 | 0 | 0 | 0 | 0 | 1 | — | 735.5 | |
| 1 | 1 | 0 | 1 | 0 | 0 | 1 | — | 703.5 | |
| 1 | 1 | 0 | 1 | 0 | 1 | 1 | — | 671.5 | |
| 1 | 1 | 0 | 1 | 1 | 1 | 1 | — | 639.5 | |
| 1 | 1 | 0 | 1 | 1 | 0 | 1 | — | 607.5 | |
| 1 | 1 | 1 | 1 | 1 | 0 | 1 | — | 575.5 | |
| 1 | 1 | 1 | 1 | 1 | 1 | 1 | — | 543.5 | |
| 1 | 1 | 1 | 1 | 0 | 1 | 1 | — | 511.5 | |
| 1 | 1 | 1 | 1 | 0 | 0 | 1 | — | 487.5 | |
| 1 | 1 | 1 | 0 | 0 | 0 | 1 | — | 471.5 | |
| 1 | 1 | 1 | 0 | 0 | 1 | 1 | — | 455.5 | |
| 1 | 1 | 1 | 0 | 1 | 1 | 1 | — | 439.5 | |
| 1 | 1 | 1 | 0 | 1 | 0 | 1 | — | 423.5 | |
| 0 | 1 | 1 | 0 | 1 | 0 | 1 | — | 407.5 | |
| 0 | 1 | 1 | 0 | 1 | 1 | 1 | — | 391.5 | |

APPENDIX I-continued

| I7 | I6 | I5 | I4 | I3 | I2 | X1 | X0 | Amplitude of Signal Point | |
|---|---|---|---|---|---|---|---|---|---|
| 0 | 1 | 1 | 0 | 0 | 1 | 1 | — | 375.5 | |
| 0 | 1 | 1 | 0 | 0 | 0 | 1 | — | 359.5 | |
| 0 | 1 | 1 | 1 | 0 | 0 | 1 | — | 343.5 | |
| 0 | 1 | 1 | 1 | 0 | 1 | 1 | — | 327.5 | |
| 0 | 1 | 1 | 1 | 1 | 1 | 1 | — | 311.5 | |
| 0 | 1 | 1 | 1 | 1 | 0 | 1 | — | 295.5 | |
| 0 | 1 | 0 | 1 | 1 | 0 | 1 | — | 279.5 | |
| 0 | 1 | 0 | 1 | 1 | 1 | 1 | — | 263.5 | |
| | | | | | | | | | 255.5 |
| 0 | 1 | 0 | 1 | 0 | 1 | 1 | 1 | 247.5 | Coded 88-PAM |
| 0 | 1 | 0 | 1 | 0 | 1 | 1 | 0 | 235.5 | Inner Subconstellation |
| 0 | 1 | 0 | 1 | 0 | 0 | 0 | 1 | 227.5 | |
| 0 | 1 | 0 | 1 | 0 | 0 | 0 | 0 | 219.5 | |
| 0 | 1 | 0 | 0 | 0 | 0 | 1 | 1 | 211.5 | |
| 0 | 1 | 0 | 0 | 0 | 0 | 1 | 0 | 203.5 | |
| 0 | 1 | 0 | 0 | 0 | 0 | 0 | 1 | 195.5 | |
| 0 | 1 | 0 | 0 | 0 | 0 | 0 | 0 | 187.5 | |
| 0 | 1 | 0 | 0 | 0 | 1 | 1 | 1 | 179.5 | |
| 0 | 1 | 0 | 0 | 0 | 1 | 1 | 0 | 171.5 | |
| 0 | 1 | 0 | 0 | 0 | 1 | 0 | 1 | 163.5 | |
| 0 | 1 | 0 | 0 | 0 | 1 | 0 | 0 | 155.5 | |
| 0 | 1 | 0 | 0 | 1 | 1 | 1 | 1 | 147.5 | |
| 0 | 1 | 0 | 0 | 1 | 1 | 1 | 0 | 139.5 | |
| 0 | 1 | 0 | 0 | 1 | 1 | 0 | 1 | 131.5 | |
| 0 | 1 | 0 | 0 | 1 | 1 | 0 | 0 | 123.5 | |
| 0 | 1 | 0 | 0 | 1 | 0 | 1 | 1 | 115.5 | |
| 0 | 1 | 0 | 0 | 1 | 0 | 1 | 0 | 109.5 | |
| 0 | 1 | 0 | 0 | 1 | 0 | 0 | 1 | 105.5 | |
| 0 | 1 | 0 | 0 | 1 | 0 | 0 | 0 | 101.5 | |
| 0 | 0 | 0 | 0 | 1 | 0 | 1 | 1 | 97.5 | |
| 0 | 0 | 0 | 0 | 1 | 0 | 1 | 0 | 93.5 | |
| 0 | 0 | 0 | 0 | 1 | 0 | 0 | 1 | 89.5 | |
| 0 | 0 | 0 | 0 | 1 | 0 | 0 | 0 | 85.5 | |
| 0 | 0 | 0 | 0 | 1 | 1 | 1 | 1 | 81.5 | |
| 0 | 0 | 0 | 0 | 1 | 1 | 1 | 0 | 77.5 | |
| 0 | 0 | 0 | 0 | 1 | 1 | 0 | 1 | 73.5 | |
| 0 | 0 | 0 | 0 | 1 | 1 | 0 | 0 | 69.5 | |
| 0 | 0 | 0 | 0 | 0 | 1 | 1 | 1 | 65.5 | |
| 0 | 0 | 0 | 0 | 0 | 1 | 1 | 0 | 61.5 | |
| 0 | 0 | 0 | 0 | 0 | 1 | 0 | 1 | 57.5 | |
| 0 | 0 | 0 | 0 | 0 | 1 | 0 | 0 | 53.5 | |
| 0 | 0 | 0 | 0 | 0 | 0 | 1 | 1 | 46.5 | |
| 0 | 0 | 0 | 0 | 0 | 0 | 1 | 0 | 42.5 | |
| 0 | 0 | 0 | 0 | 0 | 0 | 0 | 1 | 38.5 | |
| 0 | 0 | 0 | 0 | 0 | 0 | 0 | 0 | 34.5 | |
| 0 | 0 | 1 | 0 | 0 | 0 | 1 | 1 | 30.5 | |
| 0 | 0 | 1 | 0 | 0 | 0 | 1 | 0 | 26.5 | |
| 0 | 0 | 1 | 0 | 0 | 0 | 0 | 1 | 22.5 | |
| 0 | 0 | 1 | 0 | 0 | 0 | 0 | 0 | 18.5 | |
| 0 | 0 | 1 | 0 | 0 | 1 | 1 | 1 | 14.0 | |
| 0 | 0 | 1 | 0 | 0 | 1 | 1 | 0 | 10.0 | |
| 0 | 0 | 1 | 0 | 0 | 1 | 0 | 1 | 6.0 | |
| 0 | 0 | 1 | 0 | 0 | 1 | 0 | 0 | 2.0 | |
| 0 | 0 | 1 | 0 | 1 | 1 | 1 | 1 | -2.0 | |
| 0 | 0 | 1 | 0 | 1 | 1 | 1 | 0 | -6.0 | |
| 0 | 0 | 1 | 0 | 1 | 1 | 0 | 1 | -10.0 | |
| 0 | 0 | 1 | 0 | 1 | 1 | 0 | 0 | -14.0 | |
| 0 | 0 | 1 | 0 | 1 | 0 | 1 | 1 | -18.5 | |
| 0 | 0 | 1 | 0 | 1 | 0 | 1 | 0 | -22.5 | |
| 0 | 0 | 1 | 0 | 1 | 0 | 0 | 1 | -26.5 | |
| 0 | 0 | 1 | 0 | 1 | 0 | 0 | 0 | -30.5 | |
| 0 | 0 | 1 | 1 | 1 | 0 | 1 | 1 | -34.5 | |
| 0 | 0 | 1 | 1 | 1 | 0 | 1 | 0 | -38.5 | |
| 0 | 0 | 1 | 1 | 1 | 0 | 0 | 1 | -42.5 | |
| 0 | 0 | 1 | 1 | 1 | 0 | 0 | 0 | -46.5 | |
| 0 | 0 | 1 | 1 | 1 | 1 | 1 | 1 | -53.5 | |
| 0 | 0 | 1 | 1 | 1 | 1 | 1 | 0 | -57.5 | |
| 0 | 0 | 1 | 1 | 1 | 1 | 0 | 1 | -61.5 | |
| 0 | 0 | 1 | 1 | 1 | 1 | 0 | 0 | -65.5 | |
| 0 | 0 | 1 | 1 | 0 | 1 | 1 | 1 | -69.5 | |
| 0 | 0 | 1 | 1 | 0 | 1 | 1 | 0 | -73.5 | |
| 0 | 0 | 1 | 1 | 0 | 1 | 0 | 1 | -77.5 | |
| 0 | 0 | 1 | 1 | 0 | 1 | 0 | 0 | -81.5 | |
| 0 | 0 | 1 | 1 | 0 | 0 | 1 | 1 | -85.5 | |

APPENDIX I-continued

| I7 | I6 | I5 | I4 | I3 | I2 | X1 | X0 | Amplitude of Signal Point | |
|---|---|---|---|---|---|---|---|---|---|
| 0 | 0 | 1 | 1 | 0 | 0 | 1 | 0 | −89.5 | |
| 0 | 0 | 1 | 1 | 0 | 0 | 0 | 1 | −93.5 | |
| 0 | 0 | 1 | 1 | 0 | 0 | 0 | 0 | −97.5 | |
| 0 | 0 | 0 | 1 | 0 | 0 | 1 | 1 | −101.5 | |
| 0 | 0 | 0 | 1 | 0 | 0 | 1 | 0 | −105.5 | |
| 0 | 0 | 0 | 1 | 0 | 0 | 0 | 1 | −109.5 | |
| 0 | 0 | 0 | 1 | 0 | 0 | 0 | 0 | −115.5 | |
| 0 | 0 | 0 | 1 | 0 | 1 | 1 | 1 | −123.5 | |
| 0 | 0 | 0 | 1 | 0 | 1 | 1 | 0 | −131.5 | |
| 0 | 0 | 0 | 1 | 0 | 1 | 0 | 1 | −139.5 | |
| 0 | 0 | 0 | 1 | 0 | 1 | 0 | 0 | −147.5 | |
| 0 | 0 | 0 | 1 | 1 | 1 | 1 | 1 | −155.5 | |
| 0 | 0 | 0 | 1 | 1 | 1 | 1 | 0 | −163.5 | |
| 0 | 0 | 0 | 1 | 1 | 1 | 0 | 1 | −171.5 | |
| 0 | 0 | 0 | 1 | 1 | 1 | 0 | 0 | −179.5 | |
| 0 | 0 | 0 | 1 | 1 | 0 | 1 | 1 | −187.5 | |
| 0 | 0 | 0 | 1 | 1 | 0 | 1 | 0 | −195.5 | |
| 0 | 0 | 0 | 1 | 1 | 0 | 0 | 1 | −203.5 | |
| 0 | 0 | 0 | 1 | 1 | 0 | 0 | 0 | −211.5 | |
| 0 | 1 | 0 | 1 | 0 | 0 | 1 | 1 | −219.5 | |
| 0 | 1 | 0 | 1 | 0 | 0 | 1 | 0 | −227.5 | |
| 0 | 1 | 0 | 1 | 0 | 1 | 0 | 1 | −235.5 | |
| 0 | 1 | 0 | 1 | 0 | 1 | 0 | 0 | −247.5 | |
| 0 | 1 | 0 | 1 | 1 | 1 | 0 | — | −263.5 | −255.5 Negative Portion of Uncoded 84-PAM Outer Subconstellation |
| 0 | 1 | 0 | 1 | 1 | 0 | 0 | — | −279.5 | |
| 0 | 1 | 1 | 1 | 1 | 0 | 0 | — | −295.5 | |
| 0 | 1 | 1 | 1 | 1 | 1 | 0 | — | −311.5 | |
| 0 | 1 | 1 | 1 | 0 | 1 | 0 | — | −327.5 | |
| 0 | 1 | 1 | 1 | 0 | 0 | 0 | — | −343.5 | |
| 0 | 1 | 1 | 0 | 0 | 0 | 0 | — | −359.5 | |
| 0 | 1 | 1 | 0 | 0 | 1 | 0 | — | −375.5 | |
| 0 | 1 | 1 | 0 | 1 | 1 | 0 | — | −391.5 | |
| 0 | 1 | 1 | 0 | 1 | 0 | 0 | — | −407.5 | |
| 1 | 1 | 1 | 0 | 1 | 0 | 0 | — | −423.5 | |
| 1 | 1 | 1 | 0 | 1 | 1 | 0 | — | −439.5 | |
| 1 | 1 | 1 | 0 | 0 | 1 | 0 | — | −455.5 | |
| 1 | 1 | 1 | 0 | 0 | 0 | 0 | — | −471.5 | |
| 1 | 1 | 1 | 1 | 0 | 0 | 0 | — | −487.5 | |
| 1 | 1 | 1 | 1 | 0 | 1 | 0 | — | −511.5 | |
| 1 | 1 | 1 | 1 | 1 | 1 | 0 | — | −543.5 | |
| 1 | 1 | 1 | 1 | 1 | 0 | 0 | — | −575.5 | |
| 1 | 1 | 0 | 1 | 1 | 0 | 0 | — | −607.5 | |
| 1 | 1 | 0 | 1 | 1 | 1 | 0 | — | −639.5 | |
| 1 | 1 | 0 | 1 | 0 | 1 | 0 | — | −671.5 | |
| 1 | 1 | 0 | 1 | 0 | 0 | 0 | — | −703.5 | |
| 1 | 1 | 0 | 0 | 0 | 0 | 0 | — | −735.5 | |
| 1 | 1 | 0 | 0 | 0 | 1 | 0 | — | −767.5 | |
| 1 | 1 | 0 | 0 | 1 | 1 | 0 | — | −799.5 | |
| 1 | 1 | 0 | 0 | 1 | 0 | 0 | — | −831.5 | |
| 1 | 0 | 0 | 0 | 1 | 0 | 0 | — | −863.5 | |
| 1 | 0 | 0 | 0 | 1 | 1 | 0 | — | −895.5 | |
| 1 | 0 | 0 | 0 | 0 | 1 | 0 | — | −927.5 | |
| 1 | 0 | 0 | 0 | 0 | 0 | 0 | — | −959.5 | |
| 1 | 0 | 0 | 1 | 0 | 0 | 0 | — | −991.5 | |
| 1 | 0 | 0 | 1 | 0 | 1 | 0 | — | −1,039.5 | |
| 1 | 0 | 0 | 1 | 1 | 1 | 0 | — | −1,103.5 | |
| 1 | 0 | 0 | 1 | 1 | 0 | 0 | — | −1,167.5 | |
| 1 | 0 | 1 | 1 | 1 | 0 | 0 | — | −1,231.5 | |
| 1 | 0 | 1 | 1 | 1 | 1 | 0 | — | −1,295.5 | |
| 1 | 0 | 1 | 1 | 0 | 1 | 0 | — | −1,359.5 | |
| 1 | 0 | 1 | 1 | 0 | 0 | 0 | — | −1,423.5 | |
| 1 | 0 | 1 | 0 | 0 | 0 | 0 | — | −1,487.5 | |
| 1 | 0 | 1 | 0 | 1 | 0 | 0 | — | −1,551.5 | |
| 1 | 0 | 1 | 0 | 1 | 1 | 0 | — | −1,615.5 | |
| 1 | 0 | 1 | 0 | 0 | 1 | 0 | — | −1,679.5 | |

APPENDIX II

| I8 | I7 | I6 | I5 | I4 | I3 | I2 | X1 | X0 | Amplitude of Signal Point | |
|---|---|---|---|---|---|---|---|---|---|---|
| 1 | 1 | 0 | 0 | 0 | 0 | 0 | 0 | — | 1,423.5 | Positive Portion of Uncoded 76-PAM Outer Subconstellation |
| 1 | 1 | 0 | 0 | 0 | 0 | 0 | 1 | — | 1,359.5 | |
| 1 | 1 | 0 | 0 | 0 | 1 | 0 | 1 | — | 1,295.5 | |
| 1 | 1 | 0 | 0 | 0 | 1 | 0 | 0 | — | 1,231.5 | |
| 1 | 0 | 1 | 0 | 0 | 1 | 0 | 0 | — | 1,167.5 | |
| 1 | 0 | 1 | 0 | 0 | 1 | 0 | 1 | — | 1,103.5 | |
| 1 | 0 | 1 | 0 | 0 | 0 | 0 | 1 | — | 1,039.5 | |
| 1 | 0 | 1 | 0 | 0 | 0 | 0 | 0 | — | 991.5 | |
| 1 | 0 | 0 | 0 | 0 | 0 | 0 | 0 | — | 959.5 | |
| 1 | 0 | 0 | 0 | 0 | 0 | 0 | 1 | — | 927.5 | |
| 1 | 0 | 0 | 0 | 0 | 1 | 0 | 1 | — | 895.5 | |
| 1 | 0 | 0 | 0 | 0 | 1 | 0 | 0 | — | 863.5 | |
| 0 | 1 | 0 | 0 | 0 | 1 | 0 | 0 | — | 831.5 | |
| 0 | 1 | 0 | 0 | 0 | 1 | 0 | 1 | — | 799.5 | |
| 0 | 1 | 0 | 0 | 0 | 0 | 0 | 1 | — | 767.5 | |
| 0 | 1 | 0 | 0 | 0 | 0 | 0 | 0 | — | 735.5 | |
| 0 | 1 | 0 | 0 | 1 | 0 | 0 | 0 | — | 703.5 | |
| 0 | 1 | 0 | 0 | 1 | 0 | 0 | 1 | — | 671.5 | |
| 0 | 1 | 0 | 0 | 1 | 1 | 0 | 1 | — | 639.5 | |
| 0 | 1 | 0 | 0 | 1 | 1 | 0 | 0 | — | 607.5 | |
| 0 | 1 | 0 | 1 | 1 | 1 | 0 | 0 | — | 575.5 | |
| 0 | 1 | 0 | 1 | 1 | 1 | 0 | 1 | — | 543.5 | |
| 0 | 1 | 0 | 1 | 1 | 0 | 0 | 1 | — | 511.5 | |
| 0 | 1 | 0 | 1 | 1 | 0 | 0 | 0 | — | 487.5 | |
| 0 | 1 | 0 | 1 | 0 | 0 | 0 | 0 | — | 471.5 | |
| 0 | 1 | 0 | 1 | 0 | 0 | 0 | 1 | — | 455.5 | |
| 0 | 1 | 0 | 1 | 0 | 1 | 0 | 1 | — | 439.5 | |
| 0 | 1 | 0 | 1 | 0 | 1 | 0 | 0 | — | 423.5 | |
| 0 | 0 | 1 | 1 | 0 | 1 | 0 | 0 | — | 407.5 | |
| 0 | 0 | 1 | 1 | 0 | 1 | 0 | 1 | — | 391.5 | |
| 0 | 0 | 1 | 1 | 0 | 0 | 0 | 1 | — | 375.5 | |
| 0 | 0 | 1 | 1 | 0 | 0 | 0 | 0 | — | 359.5 | |
| 0 | 0 | 1 | 1 | 1 | 0 | 0 | 0 | — | 343.5 | |
| 0 | 0 | 1 | 1 | 1 | 0 | 0 | 1 | — | 327.5 | |
| 0 | 0 | 1 | 1 | 1 | 1 | 0 | 1 | — | 311.5 | |
| 0 | 0 | 1 | 1 | 1 | 1 | 0 | 0 | — | 295.5 | |
| 0 | 0 | 1 | 0 | 1 | 1 | 0 | 0 | — | 279.5 | |
| 0 | 0 | 1 | 0 | 1 | 1 | 0 | 1 | — | 263.5 | |
| 0 | 0 | 1 | 0 | 1 | 0 | 0 | 1 | 1 | 247.5 | 255.5 Coded 88-PAM Inner Subconstellation |
| 0 | 0 | 1 | 0 | 1 | 0 | 0 | 1 | 0 | 235.5 | |
| 0 | 0 | 1 | 0 | 1 | 0 | 0 | 0 | 1 | 227.5 | |
| 0 | 0 | 1 | 0 | 1 | 0 | 0 | 0 | 0 | 219.5 | |
| 0 | 0 | 1 | 0 | 0 | 0 | 0 | 1 | 1 | 211.5 | |
| 0 | 0 | 1 | 0 | 0 | 0 | 0 | 1 | 0 | 203.5 | |
| 0 | 0 | 1 | 0 | 0 | 0 | 0 | 0 | 1 | 195.5 | |
| 0 | 0 | 1 | 0 | 0 | 0 | 0 | 0 | 0 | 187.5 | |
| 0 | 0 | 1 | 0 | 0 | 1 | 0 | 1 | 1 | 179.5 | |
| 0 | 0 | 1 | 0 | 0 | 1 | 0 | 1 | 0 | 171.5 | |
| 0 | 0 | 1 | 0 | 0 | 1 | 0 | 0 | 1 | 163.5 | |
| 0 | 0 | 1 | 0 | 0 | 1 | 0 | 0 | 0 | 155.5 | |
| 0 | 0 | 0 | 0 | 0 | 1 | 0 | 1 | 1 | 147.5 | |
| 0 | 0 | 0 | 0 | 0 | 1 | 0 | 1 | 0 | 139.5 | |
| 0 | 0 | 0 | 0 | 0 | 1 | 0 | 0 | 1 | 131.5 | |
| 0 | 0 | 0 | 0 | 0 | 1 | 0 | 0 | 0 | 123.5 | |
| 0 | 0 | 0 | 0 | 0 | 0 | 0 | 1 | 1 | 115.5 | |
| 0 | 0 | 0 | 0 | 0 | 0 | 0 | 1 | 0 | 109.5 | |
| 0 | 0 | 0 | 0 | 0 | 0 | 0 | 0 | 1 | 105.5 | |
| 0 | 0 | 0 | 0 | 0 | 0 | 0 | 0 | 0 | 101.5 | |
| 0 | 0 | 0 | 0 | 1 | 0 | 0 | 1 | 1 | 97.5 | |
| 0 | 0 | 0 | 0 | 1 | 0 | 0 | 1 | 0 | 93.5 | |
| 0 | 0 | 0 | 0 | 1 | 0 | 0 | 0 | 1 | 89.5 | |
| 0 | 0 | 0 | 0 | 1 | 0 | 0 | 0 | 0 | 85.5 | |
| 0 | 0 | 0 | 0 | 1 | 1 | 0 | 1 | 1 | 81.5 | |
| 0 | 0 | 0 | 0 | 1 | 1 | 0 | 1 | 0 | 77.5 | |
| 0 | 0 | 0 | 0 | 1 | 1 | 0 | 0 | 1 | 73.5 | |
| 0 | 0 | 0 | 0 | 1 | 1 | 0 | 0 | 0 | 69.5 | |
| 0 | 0 | 0 | 1 | 1 | 1 | 0 | 1 | 1 | 65.5 | |
| 0 | 0 | 0 | 1 | 1 | 1 | 0 | 1 | 0 | 61.5 | |
| 0 | 0 | 0 | 1 | 1 | 1 | 0 | 0 | 1 | 57.5 | |
| 0 | 0 | 0 | 1 | 1 | 1 | 0 | 0 | 0 | 53.5 | |
| 0 | 0 | 0 | 1 | 1 | 0 | 0 | 1 | 1 | 46.5 | |
| 0 | 0 | 0 | 1 | 1 | 0 | 0 | 1 | 0 | 42.5 | |
| 0 | 0 | 0 | 1 | 1 | 0 | 0 | 0 | 1 | 38.5 | |

APPENDIX II-continued

| I8 | I7 | I6 | I5 | I4 | I3 | I2 | X1 | X0 | Amplitude of Signal Point | |
|---|---|---|---|---|---|---|---|---|---|---|
| 0 | 0 | 0 | 1 | 1 | 0 | 0 | 0 | 0 | 34.5 | |
| 0 | 0 | 0 | 1 | 0 | 0 | 0 | 1 | 1 | 30.5 | |
| 0 | 0 | 0 | 1 | 0 | 0 | 0 | 1 | 0 | 26.5 | |
| 0 | 0 | 0 | 1 | 0 | 0 | 0 | 0 | 1 | 22.5 | |
| 0 | 0 | 0 | 1 | 0 | 0 | 0 | 0 | 0 | 18.5 | |
| 0 | 0 | 0 | 1 | 0 | 1 | 0 | 1 | 1 | 14.0 | |
| 0 | 0 | 0 | 1 | 0 | 1 | 0 | 1 | 0 | 10.0 | |
| 0 | 0 | 0 | 1 | 0 | 1 | 0 | 0 | 1 | 6.0 | |
| 0 | 0 | 0 | 1 | 0 | 1 | 0 | 0 | 0 | 2.0 | |
| 0 | 0 | 0 | 1 | 0 | 1 | 1 | 1 | 1 | -2.0 | |
| 0 | 0 | 0 | 1 | 0 | 1 | 1 | 1 | 0 | -6.0 | |
| 0 | 0 | 0 | 1 | 0 | 1 | 1 | 0 | 1 | -10.0 | |
| 0 | 0 | 0 | 1 | 0 | 1 | 1 | 0 | 0 | -14.0 | |
| 0 | 0 | 0 | 1 | 0 | 0 | 1 | 1 | 1 | -18.5 | |
| 0 | 0 | 0 | 1 | 0 | 0 | 1 | 1 | 0 | -22.5 | |
| 0 | 0 | 0 | 1 | 0 | 0 | 1 | 0 | 1 | -26.5 | |
| 0 | 0 | 0 | 1 | 0 | 0 | 1 | 0 | 0 | -30.5 | |
| 0 | 0 | 0 | 1 | 1 | 0 | 1 | 1 | 1 | -34.5 | |
| 0 | 0 | 0 | 1 | 1 | 0 | 1 | 1 | 0 | -38.5 | |
| 0 | 0 | 0 | 1 | 1 | 0 | 1 | 0 | 1 | -42.5 | |
| 0 | 0 | 0 | 1 | 1 | 0 | 1 | 0 | 0 | -46.5 | |
| 0 | 0 | 0 | 1 | 1 | 1 | 1 | 1 | 1 | -53.5 | |
| 0 | 0 | 0 | 1 | 1 | 1 | 1 | 1 | 0 | -57.5 | |
| 0 | 0 | 0 | 1 | 1 | 1 | 1 | 0 | 1 | -61.5 | |
| 0 | 0 | 0 | 1 | 1 | 1 | 1 | 0 | 0 | -65.5 | |
| 0 | 0 | 0 | 0 | 1 | 1 | 1 | 1 | 1 | -69.5 | |
| 0 | 0 | 0 | 0 | 1 | 1 | 1 | 1 | 0 | -73.5 | |
| 0 | 0 | 0 | 0 | 1 | 1 | 1 | 0 | 1 | -77.5 | |
| 0 | 0 | 0 | 0 | 1 | 1 | 1 | 0 | 0 | -81.5 | |
| 0 | 0 | 0 | 0 | 1 | 0 | 1 | 1 | 1 | -85.5 | |
| 0 | 0 | 0 | 0 | 1 | 0 | 1 | 1 | 0 | -89.5 | |
| 0 | 0 | 0 | 0 | 1 | 0 | 1 | 0 | 1 | -93.5 | |
| 0 | 0 | 0 | 0 | 1 | 0 | 1 | 0 | 0 | -97.5 | |
| 0 | 0 | 0 | 0 | 0 | 0 | 1 | 1 | 1 | -101.5 | |
| 0 | 0 | 0 | 0 | 0 | 0 | 1 | 1 | 0 | -105.5 | |
| 0 | 0 | 0 | 0 | 0 | 0 | 1 | 0 | 1 | -109.5 | |
| 0 | 0 | 0 | 0 | 0 | 0 | 1 | 0 | 0 | -115.5 | |
| 0 | 0 | 0 | 0 | 0 | 1 | 1 | 1 | 1 | -123.5 | |
| 0 | 0 | 0 | 0 | 0 | 1 | 1 | 1 | 0 | -131.5 | |
| 0 | 0 | 0 | 0 | 0 | 1 | 1 | 0 | 1 | -139.5 | |
| 0 | 0 | 0 | 0 | 0 | 1 | 1 | 0 | 0 | -147.5 | |
| 0 | 0 | 1 | 0 | 0 | 1 | 1 | 1 | 1 | -155.5 | |
| 0 | 0 | 1 | 0 | 0 | 1 | 1 | 1 | 0 | -163.5 | |
| 0 | 0 | 1 | 0 | 0 | 1 | 1 | 0 | 1 | -171.5 | |
| 0 | 0 | 1 | 0 | 0 | 1 | 1 | 0 | 0 | -179.5 | |
| 0 | 0 | 1 | 0 | 0 | 0 | 1 | 1 | 1 | -187.5 | |
| 0 | 0 | 1 | 0 | 0 | 0 | 1 | 1 | 0 | -195.5 | |
| 0 | 0 | 1 | 0 | 0 | 0 | 1 | 0 | 1 | -203.5 | |
| 0 | 0 | 1 | 0 | 0 | 0 | 1 | 0 | 0 | -211.5 | |
| 0 | 0 | 1 | 0 | 1 | 0 | 1 | 1 | 1 | -219.5 | |
| 0 | 0 | 1 | 0 | 1 | 0 | 1 | 1 | 0 | -227.5 | |
| 0 | 0 | 1 | 0 | 1 | 0 | 1 | 0 | 1 | -235.5 | |
| 0 | 0 | 1 | 0 | 1 | 0 | 1 | 0 | 0 | -247.5 | |
| | | | | | | | | | -255.5 | Negative Portion of Uncoded 76-PAM Outer Subconstellation |
| 0 | 0 | 1 | 0 | 1 | 1 | 1 | 0 | — | -263.5 | |
| 0 | 0 | 1 | 0 | 1 | 1 | 1 | 1 | — | -279.5 | |
| 0 | 0 | 1 | 1 | 1 | 1 | 1 | 1 | — | -295.5 | |
| 0 | 0 | 1 | 1 | 1 | 1 | 1 | 0 | — | -311.5 | |
| 0 | 0 | 1 | 1 | 1 | 0 | 1 | 0 | — | -327.5 | |
| 0 | 0 | 1 | 1 | 1 | 0 | 1 | 1 | — | -343.5 | |
| 0 | 0 | 1 | 1 | 0 | 0 | 1 | 1 | — | -359.5 | |
| 0 | 0 | 1 | 1 | 0 | 0 | 1 | 0 | — | -375.5 | |
| 0 | 0 | 1 | 1 | 0 | 1 | 1 | 0 | — | -391.5 | |
| 0 | 0 | 1 | 1 | 0 | 1 | 1 | 1 | — | -407.5 | |
| 0 | 1 | 1 | 0 | 0 | 1 | 1 | 1 | — | -423.5 | |
| 0 | 1 | 1 | 0 | 0 | 1 | 1 | 0 | — | -439.5 | |
| 0 | 1 | 1 | 0 | 0 | 0 | 1 | 0 | — | -455.5 | |
| 0 | 1 | 1 | 0 | 0 | 0 | 1 | 1 | — | -471.5 | |
| 0 | 1 | 1 | 0 | 1 | 0 | 1 | 1 | — | -487.5 | |
| 0 | 1 | 1 | 0 | 1 | 0 | 1 | 0 | — | -511.5 | |
| 0 | 1 | 1 | 0 | 1 | 1 | 1 | 0 | — | -543.5 | |
| 0 | 1 | 1 | 0 | 1 | 1 | 1 | 1 | — | -575.5 | |
| 0 | 1 | 0 | 0 | 1 | 1 | 1 | 1 | — | -607.5 | |
| 0 | 1 | 0 | 0 | 1 | 1 | 1 | 0 | — | -639.5 | |
| 0 | 1 | 0 | 0 | 1 | 0 | 1 | 0 | — | -671.5 | |
| 0 | 1 | 0 | 0 | 1 | 0 | 1 | 1 | — | -703.5 | |
| 0 | 1 | 0 | 0 | 0 | 0 | 1 | 1 | — | -735.5 | |
| 0 | 1 | 0 | 0 | 0 | 0 | 1 | 0 | — | -767.5 | |
| 0 | 1 | 0 | 0 | 0 | 1 | 1 | 0 | — | -799.5 | |
| 0 | 1 | 0 | 0 | 0 | 1 | 1 | 1 | — | -831.5 | |
| 1 | 0 | 0 | 0 | 0 | 1 | 1 | 1 | — | -863.5 | |
| 1 | 0 | 0 | 0 | 0 | 1 | 1 | 0 | — | -895.5 | |
| 1 | 0 | 0 | 0 | 0 | 0 | 1 | 0 | — | -927.5 | |
| 1 | 0 | 0 | 0 | 0 | 0 | 1 | 1 | — | -959.5 | |
| 1 | 0 | 1 | 0 | 0 | 0 | 1 | 1 | — | -991.5 | |
| 1 | 0 | 1 | 0 | 0 | 0 | 1 | 0 | — | -1,039.5 | |
| 1 | 0 | 1 | 0 | 0 | 1 | 1 | 0 | — | -1,103.5 | |
| 1 | 0 | 1 | 0 | 0 | 1 | 1 | 1 | — | -1,167.5 | |
| 1 | 1 | 0 | 0 | 0 | 1 | 1 | 1 | — | -1,231.5 | |
| 1 | 1 | 0 | 0 | 0 | 1 | 1 | 0 | — | -1,295.5 | |
| 1 | 1 | 0 | 0 | 0 | 0 | 1 | 0 | — | -1,359.5 | |
| 1 | 1 | 0 | 0 | 0 | 0 | 1 | 1 | — | -1,423.5 | |

APPENDIX III

| I8 | I7 | I6 | I5 | I4 | I2 | I1 or X1 | X0 | Amplitude of Signal Point | |
|---|---|---|---|---|---|---|---|---|---|
| 1 | 1 | 0 | 0 | 0 | 0 | 0 | — | 1,487.5 | Positive Portion of Uncoded 36/72-PAM Outer Subconstellation |
| 1 | 1 | 0 | 0 | 0 | 0 | 0 | — | 1,423.5 x | |
| 1 | 1 | 0 | 0 | 0 | 0 | 1 | — | 1,359.5 | |
| 1 | 1 | 0 | 0 | 0 | 0 | 1 | — | 1,295.5 x | |
| 1 | 0 | 1 | 0 | 0 | 0 | 1 | — | 1,231.5 | |
| 1 | 0 | 1 | 0 | 0 | 0 | 1 | — | 1,167.5 x | |
| 1 | 0 | 1 | 0 | 0 | 0 | 0 | — | 1,103.5 | |
| 1 | 0 | 1 | 0 | 0 | 0 | 0 | — | 1,039.5 x | |
| 1 | 0 | 0 | 0 | 0 | 0 | 0 | — | 991.5 | |
| 1 | 0 | 0 | 0 | 0 | 0 | 0 | — | 959.5 x | |
| 1 | 0 | 0 | 0 | 0 | 1 | 0 | — | 927.5 | |
| 1 | 0 | 0 | 0 | 0 | 1 | 0 | — | 895.5 x | |
| 0 | 1 | 0 | 0 | 0 | 0 | 1 | — | 863.5 | |
| 0 | 1 | 0 | 0 | 0 | 0 | 1 | — | 831.5 x | |
| 0 | 1 | 0 | 0 | 0 | 0 | 0 | — | 799.5 | |
| 0 | 1 | 0 | 0 | 0 | 0 | 0 | — | 767.5 x | |
| 0 | 1 | 0 | 0 | 1 | 0 | 0 | — | 735.5 | |
| 0 | 1 | 0 | 0 | 1 | 0 | 0 | — | 703.5 x | |
| 0 | 1 | 0 | 0 | 1 | 0 | 1 | — | 671.5 | |
| 0 | 1 | 0 | 0 | 1 | 0 | 1 | — | 639.5 x | |
| 0 | 1 | 0 | 1 | 1 | 0 | 1 | — | 607.5 | |
| 0 | 1 | 0 | 1 | 1 | 0 | 1 | — | 575.5 x | |
| 0 | 1 | 0 | 1 | 1 | 0 | 0 | — | 543.5 | |
| 0 | 1 | 0 | 1 | 1 | 0 | 0 | — | 511.5 x | |
| 0 | 1 | 0 | 1 | 0 | 0 | 0 | — | 487.5 | |
| 0 | 1 | 0 | 1 | 0 | 0 | 0 | — | 471.5 x | |
| 0 | 1 | 0 | 1 | 0 | 0 | 1 | — | 455.5 | |
| 0 | 1 | 0 | 1 | 0 | 0 | 1 | — | 439.5 x | |
| 0 | 0 | 1 | 1 | 0 | 0 | 1 | — | 423.5 | |
| 0 | 0 | 1 | 1 | 0 | 0 | 1 | — | 407.5 x | |
| 0 | 0 | 1 | 1 | 0 | 0 | 0 | — | 391.5 | |
| 0 | 0 | 1 | 1 | 0 | 0 | 0 | — | 375.5 x | |
| 0 | 0 | 1 | 1 | 1 | 0 | 0 | — | 359.5 | |
| 0 | 0 | 1 | 1 | 1 | 0 | 0 | — | 343.5 x | |
| 0 | 0 | 1 | 1 | 1 | 0 | 1 | — | 327.5 | |
| 0 | 0 | 1 | 1 | 1 | 0 | 1 | — | 311.5 x | |
| | | | | | | | | 303.5 | Coded 48/96-PAM Inner Subconstellation |
| 0 | 0 | 1 | 0 | 1 | 0 | 1 | 1 | 295.5 | |
| 0 | 0 | 1 | 0 | 1 | 0 | 1 | 1 | 279.5 x | |
| 0 | 0 | 1 | 0 | 1 | 0 | 1 | 0 | 263.5 | |
| 0 | 0 | 1 | 0 | 1 | 0 | 1 | 0 | 247.5 x | |
| 0 | 0 | 1 | 0 | 1 | 0 | 0 | 1 | 235.5 | |
| 0 | 0 | 1 | 0 | 1 | 0 | 0 | 1 | 227.5 x | |
| 0 | 0 | 1 | 0 | 1 | 0 | 0 | 0 | 219.5 | |
| 0 | 0 | 1 | 0 | 1 | 0 | 0 | 0 | 211.5 x | |

APPENDIX III-continued

| I8 | I7 | I6 | I5 | I4 | I2 | I1 or X1 | X0 | Amplitude of Signal Point | |
|---|---|---|---|---|---|---|---|---|---|
| 0 | 0 | 1 | 0 | 0 | 0 | 1 | 1 | 203.5 | |
| 0 | 0 | 1 | 0 | 0 | 0 | 1 | 1 | 195.5 x | |
| 0 | 0 | 1 | 0 | 0 | 0 | 1 | 0 | 187.5 | |
| 0 | 0 | 1 | 0 | 0 | 0 | 1 | 0 | 179.5 x | |
| 0 | 0 | 1 | 0 | 0 | 0 | 0 | 1 | 171.5 | |
| 0 | 0 | 1 | 0 | 0 | 0 | 0 | 1 | 163.5 x | |
| 0 | 0 | 1 | 0 | 0 | 0 | 0 | 0 | 155.5 | |
| 0 | 0 | 1 | 0 | 0 | 0 | 0 | 0 | 147.5 x | |
| 0 | 0 | 0 | 0 | 0 | 0 | 1 | 1 | 139.5 | |
| 0 | 0 | 0 | 0 | 0 | 0 | 1 | 1 | 131.5 x | |
| 0 | 0 | 0 | 0 | 0 | 0 | 1 | 0 | 123.5 | |
| 0 | 0 | 0 | 0 | 0 | 0 | 1 | 0 | 115.5 x | |
| 0 | 0 | 0 | 0 | 0 | 0 | 0 | 1 | 109.5 | |
| 0 | 0 | 0 | 0 | 0 | 0 | 0 | 1 | 105.5 x | |
| 0 | 0 | 0 | 0 | 0 | 0 | 0 | 0 | 101.5 | |
| 0 | 0 | 0 | 0 | 0 | 0 | 0 | 0 | 97.5 x | |
| 0 | 0 | 0 | 0 | 1 | 0 | 1 | 1 | 93.5 | |
| 0 | 0 | 0 | 0 | 1 | 0 | 1 | 1 | 89.5 x | |
| 0 | 0 | 0 | 0 | 1 | 0 | 1 | 0 | 85.5 | |
| 0 | 0 | 0 | 0 | 1 | 0 | 1 | 0 | 81.5 x | |
| 0 | 0 | 0 | 0 | 1 | 0 | 0 | 1 | 77.5 | |
| 0 | 0 | 0 | 0 | 1 | 0 | 0 | 1 | 73.5 x | |
| 0 | 0 | 0 | 0 | 1 | 0 | 0 | 0 | 69.5 | |
| 0 | 0 | 0 | 0 | 1 | 0 | 0 | 0 | 65.5 x | |
| 0 | 0 | 0 | 1 | 1 | 0 | 1 | 1 | 61.5 | |
| 0 | 0 | 0 | 1 | 1 | 0 | 1 | 1 | 57.5 x | |
| 0 | 0 | 0 | 1 | 1 | 0 | 1 | 0 | 46.5 | |
| 0 | 0 | 0 | 1 | 1 | 0 | 1 | 0 | 44.5 x | |
| 0 | 0 | 0 | 1 | 1 | 0 | 0 | 1 | 38.5 | |
| 0 | 0 | 0 | 1 | 1 | 0 | 0 | 1 | 36.5 x | |
| 0 | 0 | 0 | 1 | 1 | 0 | 0 | 0 | 30.5 | |
| 0 | 0 | 0 | 1 | 1 | 0 | 0 | 0 | 28.5 x | |
| 0 | 0 | 0 | 1 | 0 | 0 | 1 | 1 | 22.5 | |
| 0 | 0 | 0 | 1 | 0 | 0 | 1 | 1 | 20.5 x | |
| 0 | 0 | 0 | 1 | 0 | 0 | 1 | 0 | 15.0 | |
| 0 | 0 | 0 | 1 | 0 | 0 | 1 | 0 | 14.0 x | |
| 0 | 0 | 0 | 1 | 0 | 0 | 0 | 1 | 9.0 | |
| 0 | 0 | 0 | 1 | 0 | 0 | 0 | 1 | 8.0 x | |
| 0 | 0 | 0 | 1 | 0 | 0 | 0 | 0 | 3.0 | |
| 0 | 0 | 0 | 1 | 0 | 0 | 0 | 0 | 2.0 x | |
| 0 | 0 | 0 | 1 | 0 | 1 | 1 | 1 | −2.0 x | |
| 0 | 0 | 0 | 1 | 0 | 1 | 1 | 1 | −3.0 | |
| 0 | 0 | 0 | 1 | 0 | 1 | 1 | 0 | −8.0 x | |
| 0 | 0 | 0 | 1 | 0 | 1 | 1 | 0 | −9.0 | |
| 0 | 0 | 0 | 1 | 0 | 1 | 0 | 1 | −14.0 x | |
| 0 | 0 | 0 | 1 | 0 | 1 | 0 | 1 | −15.0 | |
| 0 | 0 | 0 | 1 | 0 | 1 | 0 | 0 | −20.5 x | |
| 0 | 0 | 0 | 1 | 0 | 1 | 0 | 0 | −22.5 | |
| 0 | 0 | 0 | 1 | 1 | 1 | 1 | 1 | −28.5 x | |
| 0 | 0 | 0 | 1 | 1 | 1 | 1 | 1 | −30.5 | |
| 0 | 0 | 0 | 1 | 1 | 1 | 1 | 0 | −36.5 x | |
| 0 | 0 | 0 | 1 | 1 | 1 | 1 | 0 | −38.5 | |
| 0 | 0 | 0 | 1 | 1 | 1 | 0 | 1 | −44.5 x | |
| 0 | 0 | 0 | 1 | 1 | 1 | 0 | 1 | −46.5 | |
| 0 | 0 | 0 | 1 | 1 | 1 | 0 | 0 | −57.5 x | |
| 0 | 0 | 0 | 1 | 1 | 1 | 0 | 0 | −61.5 | |
| 0 | 0 | 0 | 0 | 1 | 1 | 1 | 1 | −65.5 x | |
| 0 | 0 | 0 | 0 | 1 | 1 | 1 | 1 | −69.5 | |
| 0 | 0 | 0 | 0 | 1 | 1 | 1 | 0 | −73.5 x | |
| 0 | 0 | 0 | 0 | 1 | 1 | 1 | 0 | −77.5 | |
| 0 | 0 | 0 | 0 | 1 | 1 | 0 | 1 | −81.5 x | |
| 0 | 0 | 0 | 0 | 1 | 1 | 0 | 1 | −85.5 | |
| 0 | 0 | 0 | 0 | 1 | 1 | 0 | 0 | −89.5 x | |
| 0 | 0 | 0 | 0 | 1 | 1 | 0 | 0 | −93.5 | |
| 0 | 0 | 0 | 0 | 0 | 1 | 1 | 1 | −97.5 x | |
| 0 | 0 | 0 | 0 | 0 | 1 | 1 | 1 | −101.5 | |
| 0 | 0 | 0 | 0 | 0 | 1 | 1 | 0 | −105.5 x | |
| 0 | 0 | 0 | 0 | 0 | 1 | 1 | 0 | −109.5 | |
| 0 | 0 | 0 | 0 | 0 | 1 | 0 | 1 | −115.5 x | |
| 0 | 0 | 0 | 0 | 0 | 1 | 0 | 1 | −123.5 | |
| 0 | 0 | 0 | 0 | 0 | 1 | 0 | 0 | −131.5 x | |
| 0 | 0 | 0 | 0 | 0 | 1 | 0 | 0 | −139.5 | |
| 0 | 0 | 1 | 0 | 0 | 1 | 1 | 1 | −147.5 x | |
| 0 | 0 | 1 | 0 | 0 | 1 | 1 | 1 | −155.5 | |
| 0 | 0 | 1 | 0 | 0 | 1 | 1 | 0 | −163.5 x | |
| 0 | 0 | 1 | 0 | 0 | 1 | 1 | 0 | −171.5 | |
| 0 | 0 | 1 | 0 | 0 | 1 | 0 | 1 | −179.5 x | |
| 0 | 0 | 1 | 0 | 0 | 1 | 0 | 1 | −187.5 | |
| 0 | 0 | 1 | 0 | 0 | 1 | 0 | 0 | −195.5 x | |
| 0 | 0 | 1 | 0 | 0 | 1 | 0 | 0 | −203.5 | |
| 0 | 0 | 1 | 0 | 1 | 1 | 1 | 1 | −211.5 x | |
| 0 | 0 | 1 | 0 | 1 | 1 | 1 | 1 | −219.5 | |
| 0 | 0 | 1 | 0 | 1 | 1 | 1 | 0 | −227.5 x | |
| 0 | 0 | 1 | 0 | 1 | 1 | 1 | 0 | −235.5 | |
| 0 | 0 | 1 | 0 | 1 | 1 | 0 | 1 | −247.5 x | |
| 0 | 0 | 1 | 0 | 1 | 1 | 0 | 1 | −263.5 | |
| 0 | 0 | 1 | 0 | 1 | 1 | 0 | 0 | −279.5 x | |
| 0 | 0 | 1 | 0 | 1 | 1 | 0 | 0 | −295.5 | |
| | | | | | | | | −303.5 | |
| 0 | 0 | 1 | 1 | 1 | 1 | 0 | — | −311.5 x | Negative Portion |
| 0 | 0 | 1 | 1 | 1 | 1 | 0 | — | −327.5 | of Uncoded |
| 0 | 0 | 1 | 1 | 1 | 1 | 1 | — | −343.5 x | 36/72-PAM Outer |
| 0 | 0 | 1 | 1 | 1 | 1 | 1 | — | −359.5 | Subconstellation |
| 0 | 0 | 1 | 1 | 0 | 1 | 1 | — | −375.5 x | |
| 0 | 0 | 1 | 1 | 0 | 1 | 1 | — | −391.5 | |
| 0 | 0 | 1 | 1 | 0 | 1 | 0 | — | −407.5 x | |
| 0 | 0 | 1 | 1 | 0 | 1 | 0 | — | −423.5 | |
| 0 | 1 | 0 | 1 | 0 | 1 | 0 | — | −439.5 x | |
| 0 | 1 | 0 | 1 | 0 | 1 | 0 | — | −455.5 | |
| 0 | 1 | 0 | 1 | 0 | 1 | 1 | — | −471.5 x | |
| 0 | 1 | 0 | 1 | 0 | 1 | 1 | — | −487.5 | |
| 0 | 1 | 0 | 1 | 1 | 1 | 1 | — | −511.5 x | |
| 0 | 1 | 0 | 1 | 1 | 1 | 1 | — | −543.5 | |
| 0 | 1 | 0 | 1 | 1 | 1 | 0 | — | −575.5 x | |
| 0 | 1 | 0 | 1 | 1 | 1 | 0 | — | −607.5 | |
| 0 | 1 | 0 | 0 | 1 | 1 | 0 | — | −639.5 x | |
| 0 | 1 | 0 | 0 | 1 | 1 | 0 | — | −671.5 | |
| 0 | 1 | 0 | 0 | 1 | 1 | 1 | — | −703.5 x | |
| 0 | 1 | 0 | 0 | 1 | 1 | 1 | — | −735.5 | |
| 0 | 1 | 0 | 0 | 0 | 1 | 1 | — | −767.5 x | |
| 0 | 1 | 0 | 0 | 0 | 1 | 1 | — | −799.5 | |
| 0 | 1 | 0 | 0 | 0 | 1 | 0 | — | −831.5 x | |
| 0 | 1 | 0 | 0 | 0 | 1 | 0 | — | −863.5 | |
| 1 | 0 | 0 | 0 | 0 | 1 | 0 | — | −895.5 x | |
| 1 | 0 | 0 | 0 | 0 | 1 | 0 | — | −927.5 | |
| 1 | 0 | 0 | 0 | 0 | 1 | 1 | — | −959.5 x | |
| 1 | 0 | 0 | 0 | 0 | 1 | 1 | — | −991.5 | |
| 1 | 0 | 1 | 0 | 0 | 1 | 1 | — | −1,039.5 x | |
| 1 | 0 | 1 | 0 | 0 | 1 | 1 | — | −1,103.5 | |
| 1 | 0 | 1 | 0 | 0 | 1 | 0 | — | −1,167.5 x | |
| 1 | 0 | 1 | 0 | 0 | 1 | 0 | — | −1,231.5 | |
| 1 | 1 | 0 | 0 | 0 | 1 | 0 | — | −1,295.5 x | |
| 1 | 1 | 0 | 0 | 0 | 1 | 0 | — | −1,359.5 | |
| 1 | 1 | 0 | 0 | 0 | 1 | 1 | — | −1,423.5 x | |
| 1 | 1 | 0 | 0 | 0 | 1 | 1 | — | −1,487.5 | |

APPENDIX IV

| I7 | I6 | I5 | I4 | I3 | I2 | I1 or X1 | X0 | Amplitude of Signal Point before 3 dB Digital Attenuation | Amplitude of Signal Point after 3 dB Digital Attenuation | |
|---|---|---|---|---|---|---|---|---|---|---|
| 1 | 0 | 0 | 0 | 1 | 0 | 1 | — | 1,615.5 | 1,167.5 | Positive Portion of |
| 1 | 0 | 0 | 0 | 1 | 0 | 0 | — | 1,551.5 | 1,103.5 | Uncoded 56-PAM |
| 1 | 0 | 0 | 0 | 0 | 0 | 0 | — | 1,487.5 | 1,039.5 | Outer Subconstellation |
| 1 | 0 | 0 | 0 | 0 | 0 | 1 | — | 1,423.5 | 991.5 | |
| 1 | 0 | 0 | 1 | 0 | 0 | 1 | — | 1,359.5 | 959.5 | |
| 1 | 0 | 0 | 1 | 0 | 0 | 0 | — | 1,295.5 | 927.5 | |
| 1 | 0 | 0 | 1 | 1 | 0 | 0 | — | 1,231.5 | 863.5 | |
| 1 | 0 | 0 | 1 | 1 | 0 | 1 | — | 1,167.5 | 831.5 | |
| 1 | 0 | 1 | 1 | 1 | 0 | 1 | — | 1,103.5 | 767.5 | |
| 1 | 0 | 1 | 1 | 1 | 0 | 0 | — | 1,039.5 | 735.5 | |
| 1 | 0 | 1 | 1 | 0 | 0 | 0 | — | 991.5 | 703.5 | |
| 1 | 0 | 1 | 1 | 0 | 0 | 1 | — | 927.5 | 671.5 | |
| 1 | 0 | 1 | 0 | 0 | 0 | 1 | — | 895.5 | 639.5 | |
| 1 | 0 | 1 | 0 | 0 | 0 | 0 | — | 863.5 | 607.5 | |
| 1 | 0 | 1 | 0 | 1 | 0 | 0 | — | 799.5 | 575.5 | |
| 1 | 0 | 1 | 0 | 1 | 0 | 1 | — | 767.5 | 543.5 | |
| 0 | 1 | 1 | 0 | 1 | 0 | 1 | — | 703.5 | 511.5 | |
| 0 | 1 | 1 | 0 | 1 | 0 | 0 | — | 671.5 | 471.5 | |
| 0 | 1 | 1 | 0 | 0 | 0 | 0 | — | 639.5 | 455.5 | |
| 0 | 1 | 1 | 0 | 0 | 0 | 1 | — | 607.5 | 423.5 | |
| 0 | 1 | 1 | 1 | 0 | 0 | 1 | — | 575.5 | 407.5 | |
| 0 | 1 | 1 | 1 | 0 | 0 | 0 | — | 543.5 | 391.5 | |
| 0 | 1 | 1 | 1 | 1 | 0 | 0 | — | 511.5 | 359.5 | |
| 0 | 1 | 1 | 1 | 1 | 0 | 1 | — | 487.5 | 343.5 | |
| 0 | 1 | 0 | 1 | 1 | 0 | 1 | — | 455.5 | 327.5 | |
| 0 | 1 | 0 | 1 | 1 | 0 | 0 | — | 439.5 | 311.5 | |
| 0 | 1 | 0 | 1 | 0 | 0 | 0 | — | 407.5 | 295.5 | |
| 0 | 1 | 0 | 1 | 0 | 0 | 1 | — | 391.5 | 279.5 | |
| | | | | | | | | | 271.5 | |
| 0 | 1 | 0 | 0 | 0 | 0 | 1 | 1 | 375.5 | 263.5 | Coded 80-PAM |
| 0 | 1 | 0 | 0 | 0 | 0 | 1 | 0 | 343.5 | 247.5 | Inner Subconstellation |
| 0 | 1 | 0 | 0 | 0 | 0 | 0 | 1 | 327.5 | 235.5 | |
| 0 | 1 | 0 | 0 | 0 | 0 | 0 | 0 | 311.5 | 219.5 | |
| 0 | 1 | 0 | 0 | 1 | 0 | 1 | 1 | 295.5 | 211.5 | |
| 0 | 1 | 0 | 0 | 1 | 0 | 1 | 0 | 279.5 | 195.5 | |
| 0 | 1 | 0 | 0 | 1 | 0 | 0 | 1 | 263.5 | 187.5 | |
| 0 | 1 | 0 | 0 | 1 | 0 | 0 | 0 | 247.5 | 171.5 | |
| 0 | 0 | 0 | 0 | 1 | 0 | 1 | 1 | 227.5 | 163.5 | |
| 0 | 0 | 0 | 0 | 1 | 0 | 1 | 0 | 219.5 | 155.5 | |
| 0 | 0 | 0 | 0 | 1 | 0 | 0 | 1 | 203.5 | 147.5 | |
| 0 | 0 | 0 | 0 | 1 | 0 | 0 | 0 | 195.5 | 139.5 | |
| 0 | 0 | 0 | 0 | 0 | 0 | 1 | 1 | 187.5 | 131.5 | |
| 0 | 0 | 0 | 0 | 0 | 0 | 1 | 0 | 171.5 | 123.5 | |
| 0 | 0 | 0 | 0 | 0 | 0 | 0 | 1 | 163.5 | 115.5 | |
| 0 | 0 | 0 | 0 | 0 | 0 | 0 | 0 | 155.5 | 109.5 | |
| 0 | 0 | 0 | 1 | 0 | 0 | 1 | 1 | 147.5 | 105.5 | |
| 0 | 0 | 0 | 1 | 0 | 0 | 1 | 0 | 139.5 | 97.5 | |
| 0 | 0 | 0 | 1 | 0 | 0 | 0 | 1 | 131.5 | 93.5 | |
| 0 | 0 | 0 | 1 | 0 | 0 | 0 | 0 | 123.5 | 85.5 | |
| 0 | 0 | 0 | 1 | 1 | 0 | 1 | 1 | 115.5 | 81.5 | |
| 0 | 0 | 0 | 1 | 1 | 0 | 1 | 0 | 109.5 | 77.5 | |
| 0 | 0 | 0 | 1 | 1 | 0 | 0 | 1 | 101.5 | 73.5 | |
| 0 | 0 | 0 | 1 | 1 | 0 | 0 | 0 | 97.5 | 69.5 | |
| 0 | 0 | 1 | 1 | 1 | 0 | 1 | 1 | 93.5 | 65.5 | |
| 0 | 0 | 1 | 1 | 1 | 0 | 1 | 0 | 85.5 | 61.5 | |
| 0 | 0 | 1 | 1 | 1 | 0 | 0 | 1 | 81.5 | 57.5 | |
| 0 | 0 | 1 | 1 | 1 | 0 | 0 | 0 | 73.5 | 53.5 | |
| 0 | 0 | 1 | 1 | 0 | 0 | 1 | 1 | 65.5 | 46.5 | |
| 0 | 0 | 1 | 1 | 0 | 0 | 1 | 0 | 61.5 | 42.5 | |
| 0 | 0 | 1 | 1 | 0 | 0 | 0 | 1 | 53.5 | 38.5 | |
| 0 | 0 | 1 | 1 | 0 | 0 | 0 | 0 | 49.5 | 34.5 | |
| 0 | 0 | 1 | 0 | 0 | 0 | 1 | 1 | 42.5 | 30.5 | |
| 0 | 0 | 1 | 0 | 0 | 0 | 1 | 0 | 36.5 | 26.5 | |
| 0 | 0 | 1 | 0 | 0 | 0 | 0 | 1 | 30.5 | 22.5 | |
| 0 | 0 | 1 | 0 | 0 | 0 | 0 | 0 | 26.5 | 18.5 | |
| 0 | 0 | 1 | 0 | 1 | 0 | 1 | 1 | 20.5 | 14.0 | |
| 0 | 0 | 1 | 0 | 1 | 0 | 1 | 0 | 14.0 | 10.0 | |
| 0 | 0 | 1 | 0 | 1 | 0 | 0 | 1 | 8.0 | 6.0 | |
| 0 | 0 | 1 | 0 | 1 | 0 | 0 | 0 | 3.0 | 2.0 | |
| 0 | 0 | 1 | 0 | 1 | 1 | 1 | 1 | −3.0 | −2.0 | |
| 0 | 0 | 1 | 0 | 1 | 1 | 1 | 0 | −8.0 | −6.0 | |
| 0 | 0 | 1 | 0 | 1 | 1 | 0 | 1 | −14.0 | −10.0 | |
| 0 | 0 | 1 | 0 | 1 | 1 | 0 | 0 | −20.5 | −14.0 | |

APPENDIX IV-continued

| I7 | I6 | I5 | I4 | I3 | I2 | I1 or X1 | X0 | Amplitude of Signal Point before 3 dB Digital Attenuation | Amplitude of Signal Point after 3 dB Digital Attenuation | |
|---|---|---|---|---|---|---|---|---|---|---|
| 0 | 0 | 1 | 0 | 0 | 1 | 1 | 1 | −26.5 | −18.5 | |
| 0 | 0 | 1 | 0 | 0 | 1 | 1 | 0 | −30.5 | −22.5 | |
| 0 | 0 | 1 | 0 | 0 | 1 | 0 | 1 | −36.5 | −26.5 | |
| 0 | 0 | 1 | 0 | 0 | 1 | 0 | 0 | −42.5 | −30.5 | |
| 0 | 0 | 1 | 1 | 0 | 1 | 1 | 1 | −49.5 | −34.5 | |
| 0 | 0 | 1 | 1 | 0 | 1 | 1 | 0 | −53.5 | −38.5 | |
| 0 | 0 | 1 | 1 | 0 | 1 | 0 | 1 | −61.5 | −42.5 | |
| 0 | 0 | 1 | 1 | 0 | 1 | 0 | 0 | −65.5 | −46.5 | |
| 0 | 0 | 1 | 1 | 1 | 1 | 1 | 1 | −73.5 | −53.5 | |
| 0 | 0 | 1 | 1 | 1 | 1 | 1 | 0 | −81.5 | −57.5 | |
| 0 | 0 | 1 | 1 | 1 | 1 | 0 | 1 | −85.5 | −61.5 | |
| 0 | 0 | 1 | 1 | 1 | 1 | 0 | 0 | −93.5 | −65.5 | |
| 0 | 0 | 0 | 1 | 1 | 1 | 1 | 1 | −97.5 | −69.5 | |
| 0 | 0 | 0 | 1 | 1 | 1 | 1 | 0 | −101.5 | −73.5 | |
| 0 | 0 | 0 | 1 | 1 | 1 | 0 | 1 | −109.5 | −77.5 | |
| 0 | 0 | 0 | 1 | 1 | 1 | 0 | 0 | −115.5 | −81.5 | |
| 0 | 0 | 0 | 1 | 0 | 1 | 1 | 1 | −123.5 | −85.5 | |
| 0 | 0 | 0 | 1 | 0 | 1 | 1 | 0 | −131.5 | −93.5 | |
| 0 | 0 | 0 | 1 | 0 | 1 | 0 | 1 | −139.5 | −97.5 | |
| 0 | 0 | 0 | 1 | 0 | 1 | 0 | 0 | −147.5 | −105.5 | |
| 0 | 0 | 0 | 0 | 0 | 1 | 1 | 1 | −155.5 | −109.5 | |
| 0 | 0 | 0 | 0 | 0 | 1 | 1 | 0 | −163.5 | −115.5 | |
| 0 | 0 | 0 | 0 | 0 | 1 | 0 | 1 | −171.5 | −123.5 | |
| 0 | 0 | 0 | 0 | 0 | 1 | 0 | 0 | −187.5 | −131.5 | |
| 0 | 0 | 0 | 0 | 1 | 1 | 1 | 1 | −195.5 | −139.5 | |
| 0 | 0 | 0 | 0 | 1 | 1 | 1 | 0 | −203.5 | −147.5 | |
| 0 | 0 | 0 | 0 | 1 | 1 | 0 | 1 | −219.5 | −155.5 | |
| 0 | 0 | 0 | 0 | 1 | 1 | 0 | 0 | −227.5 | −163.5 | |
| 0 | 1 | 0 | 0 | 1 | 1 | 1 | 1 | −247.5 | −171.5 | |
| 0 | 1 | 0 | 0 | 1 | 1 | 1 | 0 | −263.5 | −187.5 | |
| 0 | 1 | 0 | 0 | 1 | 1 | 0 | 1 | −279.5 | −195.5 | |
| 0 | 1 | 0 | 0 | 1 | 1 | 0 | 0 | −295.5 | −211.5 | |
| 0 | 1 | 0 | 0 | 0 | 1 | 1 | 1 | −311.5 | −219.5 | |
| 0 | 1 | 0 | 0 | 0 | 1 | 1 | 0 | −327.5 | −235.5 | |
| 0 | 1 | 0 | 0 | 0 | 1 | 0 | 1 | −343.5 | −247.5 | |
| 0 | 1 | 0 | 0 | 0 | 1 | 0 | 0 | −375.5 | −263.5 | −271.5 |
| 0 | 1 | 0 | 1 | 0 | 1 | 0 | — | −391.5 | −279.5 | Negative Portion of |
| 0 | 1 | 0 | 1 | 0 | 1 | 1 | — | −407.5 | −295.5 | Uncoded 56-PAM |
| 0 | 1 | 0 | 1 | 1 | 1 | 1 | — | −439.5 | −311.5 | Outer Subconstellation |
| 0 | 1 | 0 | 1 | 1 | 1 | 0 | — | −455.5 | −327.5 | |
| 0 | 1 | 1 | 1 | 1 | 1 | 0 | — | −487.5 | −343.5 | |
| 0 | 1 | 1 | 1 | 1 | 1 | 1 | — | −511.5 | −359.5 | |
| 0 | 1 | 1 | 1 | 0 | 1 | 1 | — | −543.5 | −391.5 | |
| 0 | 1 | 1 | 1 | 0 | 1 | 0 | — | −575.5 | −407.5 | |
| 0 | 1 | 1 | 0 | 0 | 1 | 0 | — | −607.5 | −423.5 | |
| 0 | 1 | 1 | 0 | 0 | 1 | 1 | — | −639.5 | −455.5 | |
| 0 | 1 | 1 | 0 | 1 | 1 | 1 | — | −671.5 | −471.5 | |
| 0 | 1 | 1 | 0 | 1 | 1 | 0 | — | −703.5 | −511.5 | |
| 1 | 0 | 1 | 0 | 1 | 1 | 0 | — | −767.5 | −543.5 | |
| 1 | 0 | 1 | 0 | 1 | 1 | 1 | — | −799.5 | −575.5 | |
| 1 | 0 | 1 | 0 | 0 | 1 | 1 | — | −863.5 | −607.5 | |
| 1 | 0 | 1 | 0 | 0 | 1 | 0 | — | −895.5 | −639.5 | |
| 1 | 0 | 1 | 1 | 0 | 1 | 0 | — | −927.5 | −671.5 | |
| 1 | 0 | 1 | 1 | 0 | 1 | 1 | — | −991.5 | −703.5 | |
| 1 | 0 | 1 | 1 | 1 | 1 | 1 | — | −1,039.5 | −735.5 | |
| 1 | 0 | 1 | 1 | 1 | 1 | 0 | — | −1,103.5 | −767.5 | |
| 1 | 0 | 0 | 1 | 1 | 1 | 0 | — | −1,167.5 | −831.5 | |
| 1 | 0 | 0 | 1 | 1 | 1 | 1 | — | −1,231.5 | −863.5 | |
| 1 | 0 | 0 | 1 | 0 | 1 | 1 | — | −1,295.5 | −927.5 | |
| 1 | 0 | 0 | 1 | 0 | 1 | 0 | — | −1,359.5 | −959.5 | |
| 1 | 0 | 0 | 0 | 0 | 1 | 0 | — | −1,423.5 | −991.5 | |
| 1 | 0 | 0 | 0 | 0 | 1 | 1 | — | −1,487.5 | −1,039.5 | |
| 1 | 0 | 0 | 0 | 1 | 1 | 1 | — | −1,551.5 | −1,103.5 | |
| 1 | 0 | 0 | 0 | 1 | 1 | 0 | — | −1,615.5 | −1,167.5 | |

APPENDIX V

| I7 | I6 | I5 | I4 | I2 | I1 or X1 | X0 | Amplitude of Signal Point before 3 dB Digital Attenuation | Amplitude of Signal Point after 3 dB Digital Attenuation | |
|----|----|----|----|----|----|----|----|----|----|
| 1 | 0 | 0 | 0 | 0 | 0 | — | 1,615.5 | 1,167.5 | Positive Portion of |
| 1 | 0 | 0 | 0 | 0 | 0 | — | 1,551.5 x | 1,103.5 | Uncoded 26/52-PAM |
| 1 | 0 | 0 | 0 | 0 | 1 | — | 1,487.5 | 1,039.5 | Outer Subconstellation |
| 1 | 0 | 0 | 0 | 0 | 1 | — | 1,423.5 x | 991.5 | |
| 1 | 0 | 0 | 1 | 0 | 1 | — | 1,359.5 | 959.5 | |
| 1 | 0 | 0 | 1 | 0 | 1 | — | 1,295.5 x | 927.5 | |
| 1 | 0 | 0 | 1 | 0 | 0 | — | 1,231.5 | 863.5 | |
| 1 | 0 | 0 | 1 | 0 | 0 | — | 1,167.5 x | 831.5 | |
| 1 | 0 | 1 | 1 | 0 | 0 | — | 1,103.5 | 767.5 | |
| 1 | 0 | 1 | 1 | 0 | 0 | — | 1,039.5 x | 735.5 | |
| 1 | 0 | 1 | 1 | 0 | 1 | — | 927.5 | 671.5 | |
| 1 | 0 | 1 | 1 | 0 | 1 | — | 895.5 x | 639.5 | |
| 1 | 0 | 1 | 0 | 0 | 1 | — | 799.5 | 575.5 | |
| 1 | 0 | 1 | 0 | 0 | 1 | — | 767.5 x | 543.5 | |
| 1 | 0 | 1 | 0 | 0 | 0 | — | 735.5 | 511.5 | |
| 1 | 0 | 1 | 0 | 0 | 0 | — | 703.5 x | 511.5 | |
| 0 | 1 | 1 | 0 | 0 | 0 | — | 671.5 | 471.5 | |
| 0 | 1 | 1 | 0 | 0 | 0 | — | 639.5 x | 455.5 | |
| 0 | 1 | 1 | 0 | 0 | 1 | — | 607.5 | 423.5 | |
| 0 | 1 | 1 | 0 | 0 | 1 | — | 575.5 x | 407.5 | |
| 0 | 1 | 1 | 1 | 0 | 1 | — | 543.5 | 391.5 | |
| 0 | 1 | 1 | 1 | 0 | 1 | — | 511.5 x | 359.5 | |
| 0 | 1 | 1 | 1 | 0 | 0 | — | 455.5 | 327.5 | |
| 0 | 1 | 1 | 1 | 0 | 0 | — | 439.5 x | 311.5 | |
| 0 | 1 | 0 | 1 | 1 | 0 | — | 423.5 | 295.5 | |
| 0 | 1 | 0 | 1 | 1 | 0 | — | 407.5 x | 295.5 | 287.5 |
| 0 | 1 | 0 | 1 | 0 | 0 | 1 | 391.5 | 279.5 | Coded 44/88-PAM |
| 0 | 1 | 0 | 1 | 0 | 0 | 1 | 375.5 x | 263.5 | Inner Subconstellation |
| 0 | 1 | 0 | 1 | 0 | 0 | 0 | 359.5 | 247.5 | |
| 0 | 1 | 0 | 1 | 0 | 0 | 0 | 343.5 x | 247.5 | |
| 0 | 1 | 0 | 0 | 0 | 1 | 1 | 327.5 | 235.5 | |
| 0 | 1 | 0 | 0 | 0 | 1 | 1 | 311.5 x | 219.5 | |
| 0 | 1 | 0 | 0 | 0 | 1 | 0 | 295.5 | 211.5 | |
| 0 | 1 | 0 | 0 | 0 | 1 | 0 | 279.5 x | 195.5 | |
| 0 | 1 | 0 | 0 | 0 | 0 | 1 | 263.5 | 187.5 | |
| 0 | 1 | 0 | 0 | 0 | 0 | 1 | 247.5 x | 171.5 | |
| 0 | 1 | 0 | 0 | 0 | 0 | 0 | 235.5 | 163.5 | |
| 0 | 1 | 0 | 0 | 0 | 0 | 0 | 227.5 x | 163.5 | |
| 0 | 0 | 0 | 0 | 0 | 1 | 1 | 203.5 | 147.5 | |
| 0 | 0 | 0 | 0 | 0 | 1 | 1 | 195.5 x | 139.5 | |
| 0 | 0 | 0 | 0 | 0 | 1 | 0 | 171.5 | 123.5 | |
| 0 | 0 | 0 | 0 | 0 | 1 | 0 | 163.5 x | 115.5 | |
| 0 | 0 | 0 | 0 | 0 | 0 | 1 | 155.5 | 109.5 | |
| 0 | 0 | 0 | 0 | 0 | 0 | 1 | 147.5 x | 105.5 | |
| 0 | 0 | 0 | 0 | 0 | 0 | 0 | 139.5 | 97.5 | |
| 0 | 0 | 0 | 0 | 0 | 0 | 0 | 131.5 x | 93.5 | |
| 0 | 0 | 0 | 1 | 0 | 1 | 1 | 123.5 | 85.5 | |
| 0 | 0 | 0 | 1 | 0 | 1 | 1 | 115.5 x | 81.5 | |
| 0 | 0 | 0 | 1 | 0 | 1 | 0 | 101.5 | 73.5 | |
| 0 | 0 | 0 | 1 | 0 | 1 | 0 | 97.5 x | 69.5 | |
| 0 | 0 | 0 | 1 | 0 | 0 | 1 | 85.5 | 61.5 | |
| 0 | 0 | 0 | 1 | 0 | 0 | 1 | 81.5 x | 57.5 | |
| 0 | 0 | 0 | 1 | 0 | 0 | 0 | 77.5 | 53.5 | |
| 0 | 0 | 0 | 1 | 0 | 0 | 0 | 73.5 x | 53.5 | |
| 0 | 0 | 1 | 1 | 0 | 1 | 1 | 69.5 | 49.5 | |
| 0 | 0 | 1 | 1 | 0 | 1 | 1 | 65.5 x | 46.5 | |
| 0 | 0 | 1 | 1 | 0 | 1 | 0 | 61.5 | 42.5 | |
| 0 | 0 | 1 | 1 | 0 | 1 | 0 | 57.5 x | 40.5 | |
| 0 | 0 | 1 | 1 | 0 | 0 | 1 | 46.5 | 32.5 | |
| 0 | 0 | 1 | 1 | 0 | 0 | 1 | 44.5 x | 30.5 | |
| 0 | 0 | 1 | 1 | 0 | 0 | 0 | 38.5 | 26.5 | |
| 0 | 0 | 1 | 1 | 0 | 0 | 0 | 36.5 x | 26.5 | |
| 0 | 0 | 1 | 0 | 0 | 1 | 1 | 30.5 | 22.5 | |
| 0 | 0 | 1 | 0 | 0 | 1 | 1 | 28.5 x | 20.5 | |
| 0 | 0 | 1 | 0 | 0 | 1 | 0 | 22.5 | 16.5 | |
| 0 | 0 | 1 | 0 | 0 | 1 | 0 | 20.5 x | 14.0 | |
| 0 | 0 | 1 | 0 | 0 | 0 | 1 | 13.0 | 9.0 | |
| 0 | 0 | 1 | 0 | 0 | 0 | 1 | 12.0 x | 8.0 | |
| 0 | 0 | 1 | 0 | 0 | 0 | 0 | 5.0 | 4.0 | |
| 0 | 0 | 1 | 0 | 0 | 0 | 0 | 4.0 x | 3.0 | |
| 0 | 0 | 1 | 0 | 1 | 1 | 1 | −4.0 x | −3.0 | |
| 0 | 0 | 1 | 0 | 1 | 1 | 1 | −5.0 | −4.0 | |

APPENDIX V-continued

| I7 | I6 | I5 | I4 | I2 | I1 X1 | or X0 | Amplitude of Signal Point before 3 dB Digital Attenuation | | Amplitude of Signal Point after 3 dB Digital Attenuation |
|---|---|---|---|---|---|---|---|---|---|
| 0 | 0 | 1 | 0 | 1 | 1 | 0 | −12.0 | x | −8.0 |
| 0 | 0 | 1 | 0 | 1 | 1 | 0 | −13.0 | | −9.0 |
| 0 | 0 | 1 | 0 | 1 | 0 | 1 | −20.5 | x | −14.0 |
| 0 | 0 | 1 | 0 | 1 | 0 | 1 | −22.5 | | −16.5 |
| 0 | 0 | 1 | 0 | 1 | 0 | 0 | −28.5 | x | −20.5 |
| 0 | 0 | 1 | 0 | 1 | 0 | 0 | −30.5 | | −22.5 |
| 0 | 0 | 1 | 1 | 1 | 1 | 1 | −36.5 | x | −26.5 |
| 0 | 0 | 1 | 1 | 1 | 1 | 1 | −38.5 | | −26.5 |
| 0 | 0 | 1 | 1 | 1 | 1 | 0 | −44.5 | x | −30.5 |
| 0 | 0 | 1 | 1 | 1 | 1 | 0 | −46.5 | | −32.5 |
| 0 | 0 | 1 | 1 | 1 | 0 | 1 | −57.5 | x | −40.5 |
| 0 | 0 | 1 | 1 | 1 | 0 | 1 | −61.5 | | −42.5 |
| 0 | 0 | 1 | 1 | 1 | 0 | 0 | −65.5 | x | −46.5 |
| 0 | 0 | 1 | 1 | 1 | 0 | 0 | −69.5 | | −49.5 |
| 0 | 0 | 0 | 1 | 1 | 1 | 1 | −73.5 | x | −53.5 |
| 0 | 0 | 0 | 1 | 1 | 1 | 1 | −77.5 | | −53.5 |
| 0 | 0 | 0 | 1 | 1 | 1 | 0 | −81.5 | x | −57.5 |
| 0 | 0 | 0 | 1 | 1 | 1 | 0 | −85.5 | | −61.5 |
| 0 | 0 | 0 | 1 | 1 | 0 | 1 | −97.5 | x | −69.5 |
| 0 | 0 | 0 | 1 | 1 | 0 | 1 | −101.5 | | −73.5 |
| 0 | 0 | 0 | 1 | 1 | 0 | 0 | −115.5 | x | −81.5 |
| 0 | 0 | 0 | 1 | 1 | 0 | 0 | −123.5 | | −85.5 |
| 0 | 0 | 0 | 0 | 1 | 1 | 1 | −131.5 | x | −93.5 |
| 0 | 0 | 0 | 0 | 1 | 1 | 1 | −139.5 | | −97.5 |
| 0 | 0 | 0 | 0 | 1 | 1 | 0 | −147.5 | x | −105.5 |
| 0 | 0 | 0 | 0 | 1 | 1 | 0 | −155.5 | | −109.5 |
| 0 | 0 | 0 | 0 | 1 | 0 | 1 | −163.5 | x | −115.5 |
| 0 | 0 | 0 | 0 | 1 | 0 | 1 | −171.5 | | −123.5 |
| 0 | 0 | 0 | 0 | 1 | 0 | 0 | −195.5 | x | −139.5 |
| 0 | 0 | 0 | 0 | 1 | 0 | 0 | −203.5 | | −147.5 |
| 0 | 1 | 0 | 0 | 1 | 1 | 1 | −227.5 | x | −163.5 |
| 0 | 1 | 0 | 0 | 1 | 1 | 1 | −235.5 | | −163.5 |
| 0 | 1 | 0 | 0 | 1 | 1 | 0 | −247.5 | x | −171.5 |
| 0 | 1 | 0 | 0 | 1 | 1 | 0 | −263.5 | | −187.5 |
| 0 | 1 | 0 | 0 | 1 | 0 | 1 | −279.5 | x | −195.5 |
| 0 | 1 | 0 | 0 | 1 | 0 | 1 | −295.5 | | −211.5 |
| 0 | 1 | 0 | 0 | 1 | 0 | 0 | −311.5 | x | −219.5 |
| 0 | 1 | 0 | 0 | 1 | 0 | 0 | −327.5 | | −235.5 |
| 0 | 1 | 0 | 1 | 0 | 1 | 1 | −343.5 | x | −247.5 |
| 0 | 1 | 0 | 1 | 0 | 1 | 1 | −359.5 | | −247.5 |
| 0 | 1 | 0 | 1 | 0 | 1 | 0 | −375.5 | x | −263.5 |
| 0 | 1 | 0 | 1 | 0 | 1 | 0 | −391.5 | | −279.5 |
| 0 | 1 | 0 | 1 | 1 | 1 | — | −407.5 | x | −295.5 |
| 0 | 1 | 0 | 1 | 1 | 1 | — | −423.5 | | −295.5 |
| 0 | 1 | 1 | 1 | 1 | 1 | — | −439.5 | x | −311.5 |
| 0 | 1 | 1 | 1 | 1 | 1 | — | −455.5 | | −327.5 |
| 0 | 1 | 1 | 1 | 1 | 0 | — | −511.5 | x | −359.5 |
| 0 | 1 | 1 | 1 | 1 | 0 | — | −543.5 | | −391.5 |
| 0 | 1 | 1 | 0 | 1 | 0 | — | −575.5 | x | −407.5 |
| 0 | 1 | 1 | 0 | 1 | 0 | — | −607.5 | | −423.5 |
| 0 | 1 | 1 | 0 | 1 | 1 | — | −639.5 | x | −455.5 |
| 0 | 1 | 1 | 0 | 1 | 1 | — | −671.5 | | −471.5 |
| 1 | 0 | 1 | 0 | 1 | 1 | — | −703.5 | x | −511.5 |
| 1 | 0 | 1 | 0 | 1 | 1 | — | −735.5 | | −511.5 |
| 1 | 0 | 1 | 0 | 1 | 0 | — | −767.5 | x | −543.5 |
| 1 | 0 | 1 | 0 | 1 | 0 | — | −799.5 | | −575.5 |
| 1 | 0 | 1 | 1 | 1 | 0 | — | −895.5 | x | −639.5 |
| 1 | 0 | 1 | 1 | 1 | 0 | — | −927.5 | | −671.5 |
| 1 | 0 | 1 | 1 | 1 | 1 | — | −1,039.5 | x | −735.5 |
| 1 | 0 | 1 | 1 | 1 | 1 | — | −1,103.5 | | −767.5 |
| 1 | 0 | 0 | 1 | 1 | 1 | — | −1,167.5 | x | −831.5 |
| 1 | 0 | 0 | 1 | 1 | 1 | — | −1,231.5 | | −863.5 |
| 1 | 0 | 0 | 1 | 1 | 0 | — | −1,295.5 | x | −927.5 |
| 1 | 0 | 0 | 1 | 1 | 0 | — | −1,359.5 | | −959.5 |
| 1 | 0 | 0 | 0 | 1 | 0 | — | −1,423.5 | x | −991.5 |
| 1 | 0 | 0 | 0 | 1 | 0 | — | −1,487.5 | | −1,039.5 |
| 1 | 0 | 0 | 0 | 1 | 1 | — | −1,551.5 | x | −1,103.5 |
| 1 | 0 | 0 | 0 | 1 | 1 | — | −1,615.5 | | −1,167.5 |

−287.5 Negative Portion of Uncoded 26/52-PAM Outer Subconstellation

The invention claimed is:

1. A method comprising the steps of
   a) using a redundancy encoder to generate a sequence of redundancy-encoded signals as a function of at least a portion of a stream of input data,
   b) in response to each of particular first ones of the redundancy encoded signals, selecting a signal point from a particular identified subset of a first plurality of signaling constellation subsets, a different one subset of the first plurality being identified for each different value of said first ones of the redundancy-encoded signals,
   c) in response to each of particular second ones of the redundancy encoded signals, selecting a signal point from a particular identified subset of a second plurality of signaling constellation subsets, at least ones of the first plurality subsets comprising a different number of signal points than at least ones of the second plurality subsets, a different one subset of the second plurality being identified for each different value of said second ones of the redundancy-encoded signals, and
   d) transmitting over a communication channel signals representing the selected signal points.

2. The invention of claim 1 wherein which of said sequence of redundancy encoded signals comprise said particular first and second ones of the redundancy-encoded signals is deterministic and independent of the values of said input data.

3. The invention of claim 1 wherein the selected signal points are transmitted during respective signaling intervals and wherein the signal points selected in step b) are transmitted over said communication channel in signaling intervals wherein there is no bit robbing in said channel and wherein the signal points selected in step c) are transmitted over said communication channel in signaling intervals wherein there is bit robbing in said channel.

4. The invention of claim 1 wherein the selected signal points are transmitted during respective signaling intervals, wherein bit robbing occurs in said communication channel for certain of said signaling intervals and not for others, wherein said method comprises the further step of determining which of said signaling intervals are the ones in which bit robbing occurs, wherein signal points to be transmitted during the signaling intervals where bit robbing does not occurs are selected using step b), and wherein signal points to be transmitted during the signaling intervals where bit robbing does occur are selected using step c).

5. The invention of claim 1 wherein in each of steps b) and c) the selection of a signal point from the identified subset is carried out as a function of at least a further portion of said input data.

6. The invention of claim 1 wherein said redundancy encoder is a trellis encoder.

7. The invention of claim 1 wherein the signal points in each of said signaling constellation subsets comprise a plurality of PCM quantization levels.

8. A method for use in a transmitter which receives a stream of input data, the method comprising the steps of
   transmitting, during each of at least ones of a first plurality of signaling intervals, a respective signal representing a signal point selected from an identified one of a first plurality of signaling constellation subsets, and
   transmitting, during each of at least ones of a second plurality of signaling intervals, a respective signal representing a signal point selected from an identified one of a second plurality of signaling constellation subsets, at least ones of the first plurality subsets comprising a different number of signal points than at least ones of the second plurality subsets, each of said first and second plurality subsets being identified in response to a respective output of the same redundancy encoder, the redundancy encoder outputs being a function of at least a portion of said input data, and in each of said transmitting steps a different subset being identified for each different redundancy encoder output value.

9. The invention of claim 8 wherein the selected signal points are selected from said first plurality of subsets and said second plurality subsets at least as a function of another portion of said input data.

10. The invention of claim 9 wherein said first and second pluralities of signaling intervals are interleaved in a deterministic order which is independent of the values of said input data.

11. The invention of claim 10 wherein in said transmitting steps the signals representing the selected signal points are respective digital words transmitted over a communication channel in which bit robbing does not occur for said first plurality of signaling intervals and does occur for said second plurality of signaling intervals.

12. The invention of claim 11 comprising the further step of receiving information indicating which of the signaling intervals are ones in which bit robbing occurs.

13. The invention of claim 11 wherein said signaling constellation subsets are PCM-derived constellation subsets.

14. The invention of claim 13 wherein said redundancy encoder is a trellis encoder.

15. The invention of claim 14 comprising the further step of transmitting, during others of said first and second plurality signaling intervals, respective signals representing signal points not in any of said subsets.

16. A method for use in a transmitter which for each of a succession of signaling intervals, transmits over a communication channel a signal representing a selected one of a plurality of PCM quantization levels, said channel being of a type in which bit robbing occurs in particular ones of the signaling intervals, said transmitter including a trellis encoder which generates a succession of trellis encoder outputs which are a function of at least a portion of a stream of input data, said method characterized by the step of
   identifying, in response to each successive trellis encoder output, a subset of said PCM quantization levels from which said one PCM quantization level is to be selected for a particular one of said signaling intervals, said subset having a first number of said PCM quantization levels when the particular signaling interval is one in which bit robbing does not occur and having a second, smaller number of said PCM quantization levels when the particular signaling interval is one in which bit robbing does occur.

17. The invention of claim 16 wherein the PCM quantization level selected from each identified subset is selected as a function of at least a further portion of said stream of input data.

18. The invention of claim 17 comprising the further step of determining which of said signaling intervals are ones in which bit robbing occurs.

19. Apparatus comprising
   means for receiving a stream of input data,
   means for applying at least a portion of said input data to an encoder which includes a redundancy encoder, said redundancy encoder generating a succession of redundancy encoder outputs,
   means for utilizing each of a succession of outputs of said redundancy encoder to select, for a respective one of a plurality of signaling intervals, one of a plurality of signaling constellation subsets, a different signaling constellation subset being selected for each different redundancy encoder output value, and means for transmitting over a communication channel a signal representing a signal point from the selected subset, for a first plurality of said signaling intervals each of the plurality of subsets having a first number of signal points, and for a second plurality of said signaling intervals each of the plurality of subsets having a second, different number of signal points.

20. The invention of claim 19 wherein said first and second pluralities of signaling intervals occur deterministically.

21. The invention of claim 19 wherein said first and second pluralities of signaling intervals appear in an order which is not dependent on the values of said input data.

22. The invention of claim 19 wherein the signals representing the transmitted signal points are binary words, wherein bit robbing does not occur in said communication channel for said first plurality of signaling intervals and does occur for said second plurality of signaling intervals.

23. The invention of claim 19 further comprising means for utilizing another portion of said input data to select a signal point not in any said subset, said signal point being transmitted over said communication channel during at least one other signaling interval which is not in either of said first and second pluralities of signaling intervals.

24. A transmitter adapted to transmit data over a communication path having a first and second channel characteristics during first and second pluralities of signaling intervals, respectively, said first and second pluralities being in a predetermined time relationship to one another, the transmitter comprising means for receiving a stream of input data, means for generating a stream of trellis-encoded signals which are a function of at least a portion of said input data, means for selecting a signaling constellation subset for each of said signaling intervals in response to said trellis-encoded signals, a different signaling constellation subset being selected for each different value of said trellis-encoded signal signals, the subsets selected for said first and second pluralities of signaling intervals comprising a first number of signal points and a second, different number of signal points, respectively, and means for transmitting over said communication path a signal point from the selected subset.

25. The invention of claim 24 wherein said first and second pluralities of signaling intervals are interleaved in a deterministic order which is independent of the values of said input data.

26. The invention of claim 24 wherein said selected signal points are transmitted over a communication channel in which bit-robbing does not occur for said first plurality of signaling intervals and does occur for said second plurality of signaling intervals.

27. The invention of claim 26 wherein the selected signal points are selected from said first plurality of subsets and said second plurality subsets as a function of at least another portion of said input data.

28. A transmitter which includes a trellis encoder, said trellis encoder generating a succession of trellis encoder outputs which are a function of at least a portion of a stream of data that is input to said transmitter, said transmitter comprising means for identifying, as a function of each successive trellis encoder output, an associated one of a plurality of subsets of PCM encoder levels, and means for transmitting over a communications channel a signal representing a particular one of the levels of the identified subset, each of said plurality of subsets having a first number of said PCM quantization levels when said signal is subject to being bit-robbed in said channel and a second, larger number of said PCM encoder levels when said signal is not subject to being bit-robbed in said channel.

29. The invention of claim 28 wherein in said transmitting means includes means for selecting the particular one of the levels of the identified subset as a function of at least a further portion of said stream of data.

* * * * *